United States Patent
Brown et al.

(10) Patent No.: US 10,061,566 B2
(45) Date of Patent: Aug. 28, 2018

(54) METHODS AND SYSTEMS TO IDENTIFY LOG WRITE INSTRUCTIONS OF A SOURCE CODE AS SOURCES OF EVENT MESSAGES

(71) Applicant: VMware, Inc., Palo Alto, CA (US)

(72) Inventors: Darren Brown, Seattle, WA (US); Nicholas Kushmerick, Seattle, WA (US); Matt Roy McLaughlin, Seattle, WA (US); Dhaval Gada, Palo Alto, CA (US); Junyuan Lin, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/286,291

(22) Filed: Oct. 5, 2016

(65) Prior Publication Data

US 2018/0095731 A1 Apr. 5, 2018

(51) Int. Cl.
*G06F 9/44* (2018.01)
*G06F 9/54* (2006.01)
*G06F 8/34* (2018.01)

(52) U.S. Cl.
CPC ............... *G06F 8/34* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 6,249,755 B1 * | 6/2001 | Yemini | G06F 11/2257 702/181 |
| 6,269,367 B1 * | 7/2001 | Travis | G06F 8/78 |
| 7,174,536 B1 * | 2/2007 | Kothari | G06F 11/3664 717/105 |
| 2002/0023257 A1 * | 2/2002 | Charisius | G06F 8/20 717/106 |
| 2008/0147698 A1 * | 6/2008 | Gustafsson | G06F 17/30569 |
| 2016/0080305 A1 * | 3/2016 | Samuni | H04L 51/24 709/207 |

OTHER PUBLICATIONS

"Tracking Source Locations" by Steven P. Reiss, ICSE'08, May 10-18, 2008, Leipzig, Germany (Year: 2008).*

* cited by examiner

*Primary Examiner* — Daxin Wu

(57) ABSTRACT

Methods and systems to identify log write instructions of a source code as potential sources of an event message of interest are described. Methods identify non-parametric tokens, such as text strings and natural language words and phrases, of an event message of interest. Candidate log write instructions and associated line numbers in a source code are identified. Non-parametric tokens of each event message of the one or more candidate log write instructions are determined. A confidence score is calculated for each candidate log write instruction based the number of non-parametric tokens the event message of interest and event message of the candidate log write instruction have in common. The candidate log write instructions are rank ordered based on the corresponding one or more confidence scores and the rank ordered candidate log write instructions and associated line numbers of the source code may be displayed in a graphical user interface.

21 Claims, 26 Drawing Sheets

```
2013-12-02T10:44:24.095Z li-qe-esx5.vmware.com Rhttpproxy:
[28959B90 verbose 'Proxy Req 46691'] Connected to
localhost:8307——1512                              1506

2013-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

FIG. 15

| | Non-parametric tokens (text strings and natural language words and phrases) |
|---|---|
| P1 | Thread |
| P2 | INFO |
| P3 | com.vmware.loginsight.commons.executor.ProcessExecutor /usr/lib/loginsight/application/lib/apache-cassandra-2.0.10 |
| P4 | /bin/nodetool |
| P5 | h |
| P6 | montools-prod-loginsight.vmware.com |
| P7 | repair |
| P8 | Repair |
| P9 | session |
| P10 | for |
| P11 | range |
| P12 | finished |

FIG. 17 event message k₁:

```
Thread ##### com.vmware.loginsight.commons.executor.ProcessExecutor/
usr/lib/loginsight/application/lib/apache-cassandra ###### ###
####### ###### ###### ####### for ##### finished
```

P1, P3, P10, P12

Confidence score = 0.33

FIG. 20A event message k₂:

```
Thread INFO ################# /bin/nodetool ############## ####
montools-prod-loginsight.vmware.com ########## Repair session for
range finished
```

P1, P2, P5, P7, P8, P9, P10, P11, P12

Confidence score = 0.75

FIG. 20B event message k₃:

```
Thread INFO com.vmware.loginsight.commons.executor.ProcessExecutor/
usr/lib/loginsight/application/lib/apache-cassandra ####### h ——P6
montools-prod-loginsight.vmware.com ############ ####### for range
finished
```

P1, P2, P3, P7, P10, P11, P12

Confidence score = 0.67

FIG. 20C event message k₄:

```
 P1    P2
Thread INFO ################ ########## #####
################## ##### ###### session for range ######
                                       /      /    /
                                      P9    P10   P11
```

Confidence score = 0.42

FIG. 20D event message k₅:

```
                                           P5
##### ################## /bin/nodetool #####
montools-prod-loginsight.vmware.com ##### ###### session #####
                /                                    /
               P7                                   P9
```

Confidence score = 0.25

FIG. 20E

| Confidence score | Program name | Version | Line number | Developer info | Source code link |
|---|---|---|---|---|---|
| 0.75 | PN(i) | V(j) | 9 | DI | Link 1 |
| 0.67 | PN(i) | V(j) | 17 |  | Link 2 |
| 0.42 | PN(i) | V(j) | 20 |  | Link 3 |
| 0.33 | PN(i) | V(j) | 4 | DI | Link 4 |
| 0.25 | PN(i) | V(j) | 24 | DI | Link 5 |
| ⋮ | ⋮ | ⋮ | ⋮ | ⋮ | ⋮ |

2104 — Confidence score; 2106 — Line number; 2102; 2108 — Source code link

FIG. 21

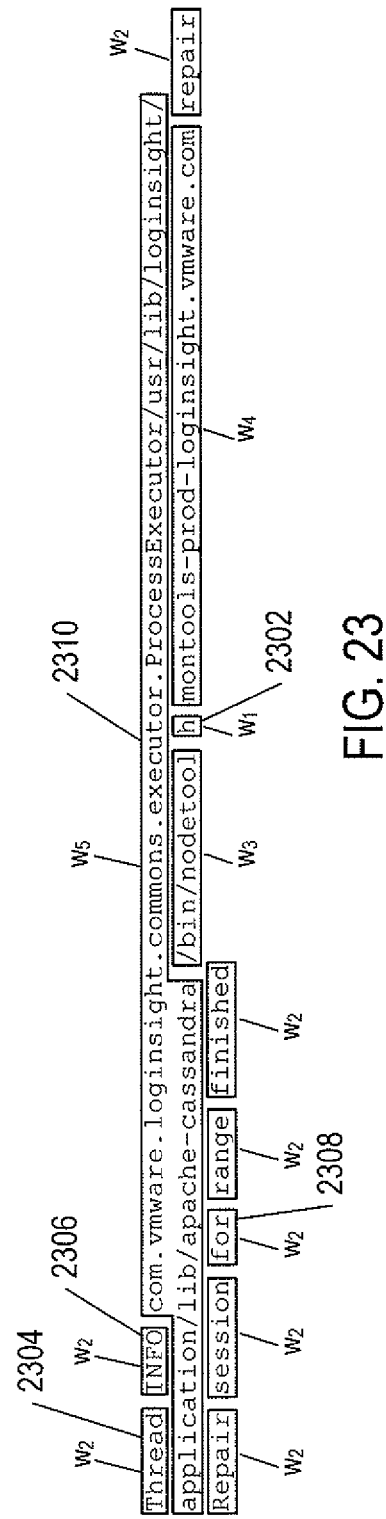

METHODS AND SYSTEMS TO IDENTIFY LOG WRITE INSTRUCTIONS OF A SOURCE CODE AS SOURCES OF EVENT MESSAGES

TECHNICAL FIELD

The present disclosure is directed to methods and systems to identify and rank log write instructions of a source code that are potential sources of an event message of interest.

BACKGROUND

During the past several decades, electronic computing has evolved from primitive, vacuum-tube-based computer systems, initially developed during the 1940s, to modern electronic computing systems in which large numbers of multiprocessor server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." Each event Message corresponds to a specific logging statement in an original source code. However, in large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. For example, a source code may include numerous different types of log write instruction that are each executed when particular breaches or issues arise during execution of the source code. Ideally, a source code developer or another information technology manager may want to learn the location of the log write instruction that generated a particular event message in order to investigate the surrounding source code for any issues. However, because the source code may have many thousands of different log write instructions, attempts to sift through many thousands if not millions of source code comments, statements, computer instructions in order to locate the particular log write instruction that generated the event message is extremely time consuming and error prone, which may lead to identification of an incorrect log write instruction.

SUMMARY

Methods and systems to identify log write instructions of a source code as potential sources of an event message of interest are described. Method identify non-parametric tokens, such as text strings and natural language words and phrases, of an event message of interest. One or more log write instructions and associated line numbers in a source code are identified as candidates for generating the event message of interest. Non-parametric tokens of each event message of the one or more candidate log write instructions are determined. For each of the one or more candidate log write instructions, a confidence score is calculated based the number of non-parametric tokens the event message of interest and event message of the candidate log write instruction have in common. The one or more candidate log write instructions are rank ordered based on the corresponding one or more confidence scores and the rank ordered candidate log write instructions and associated line numbers of the source code may be displayed in a graphical user interface.

DESCRIPTION OF THE DRAWINGS

FIG. 15 shows a small, eight-entry portion of an event-log file.

FIG. 17 shows a table that list non-parametric tokens of an event message.

FIGS. 20A-20E show examples of event message candidates.

FIG. 21 shows an example table that provides a list confidence scores, line numbers of log write instructions, source code names, versions, developer information, and links for the event message candidates in FIGS. 20A-20E.

FIG. 22 shows a table of example weights assigned to non-parametric tokens of an event message of interest based on token type.

FIG. 23 shows an example assignment of weights in the table of FIG. 22 to non-parametric tokens of an event message of interest.

DETAILED DESCRIPTION

Figure 1:
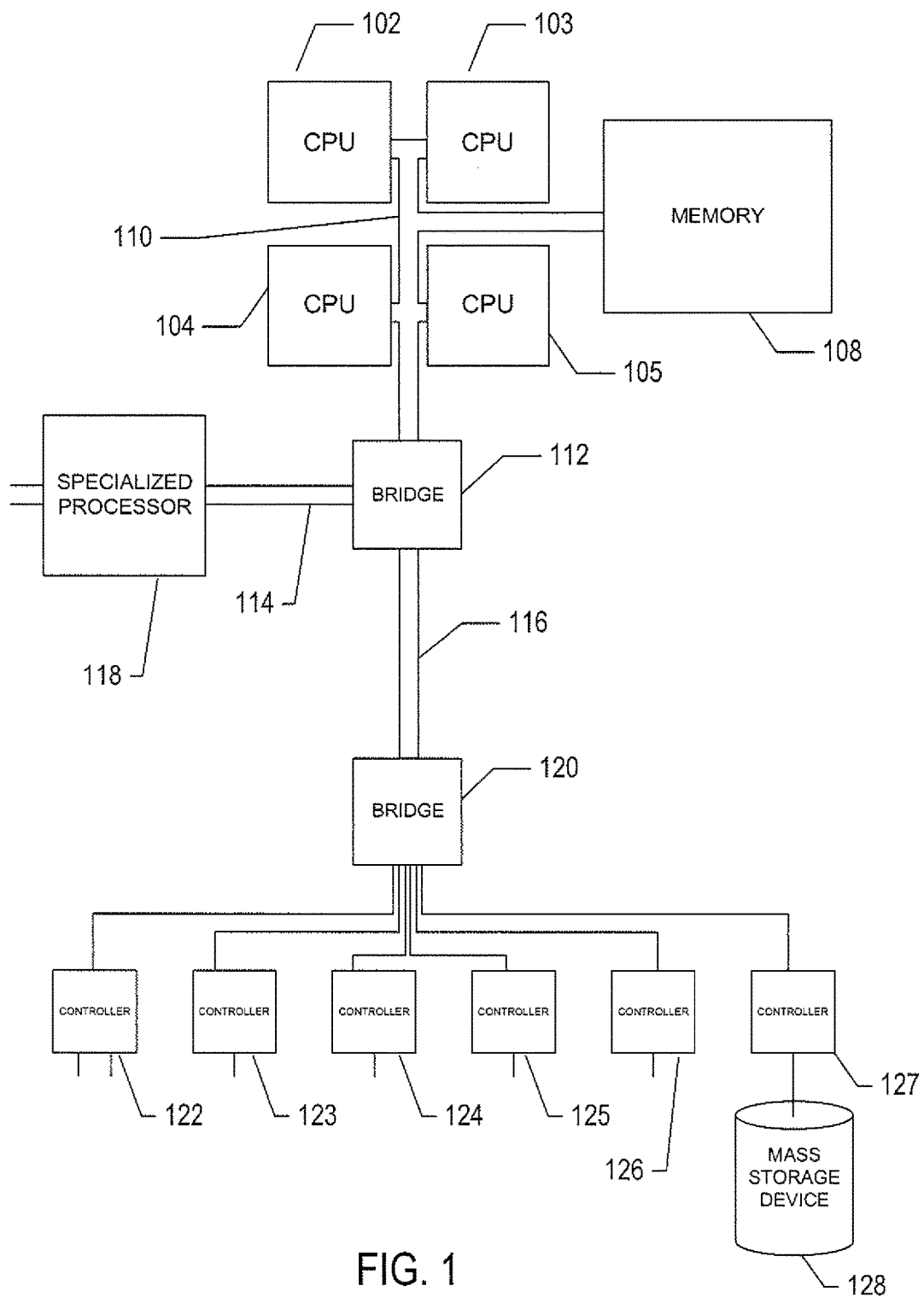
FIG. 1 shows a general architectural diagram for various types of computers.

This disclosure presents computational methods and systems to identify log write instructions of a source code as potential sources of an event message of interest are described below in a second subsection. In a first subsection, computer hardware, complex computational systems, and virtualization are described. Methods and systems to identify log write instructions of a source code as potential sources of an event message of interest are described below in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic Memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
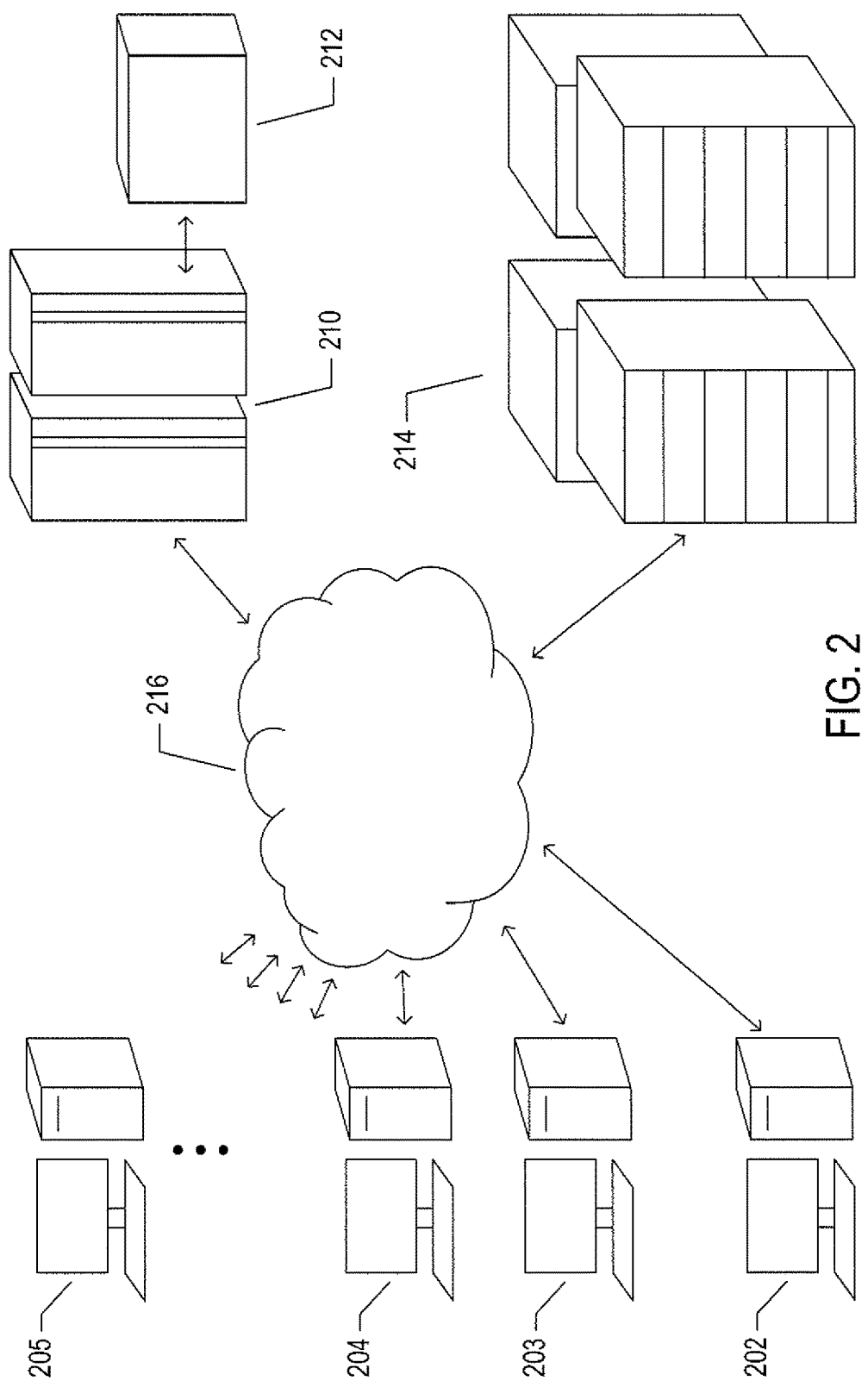
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
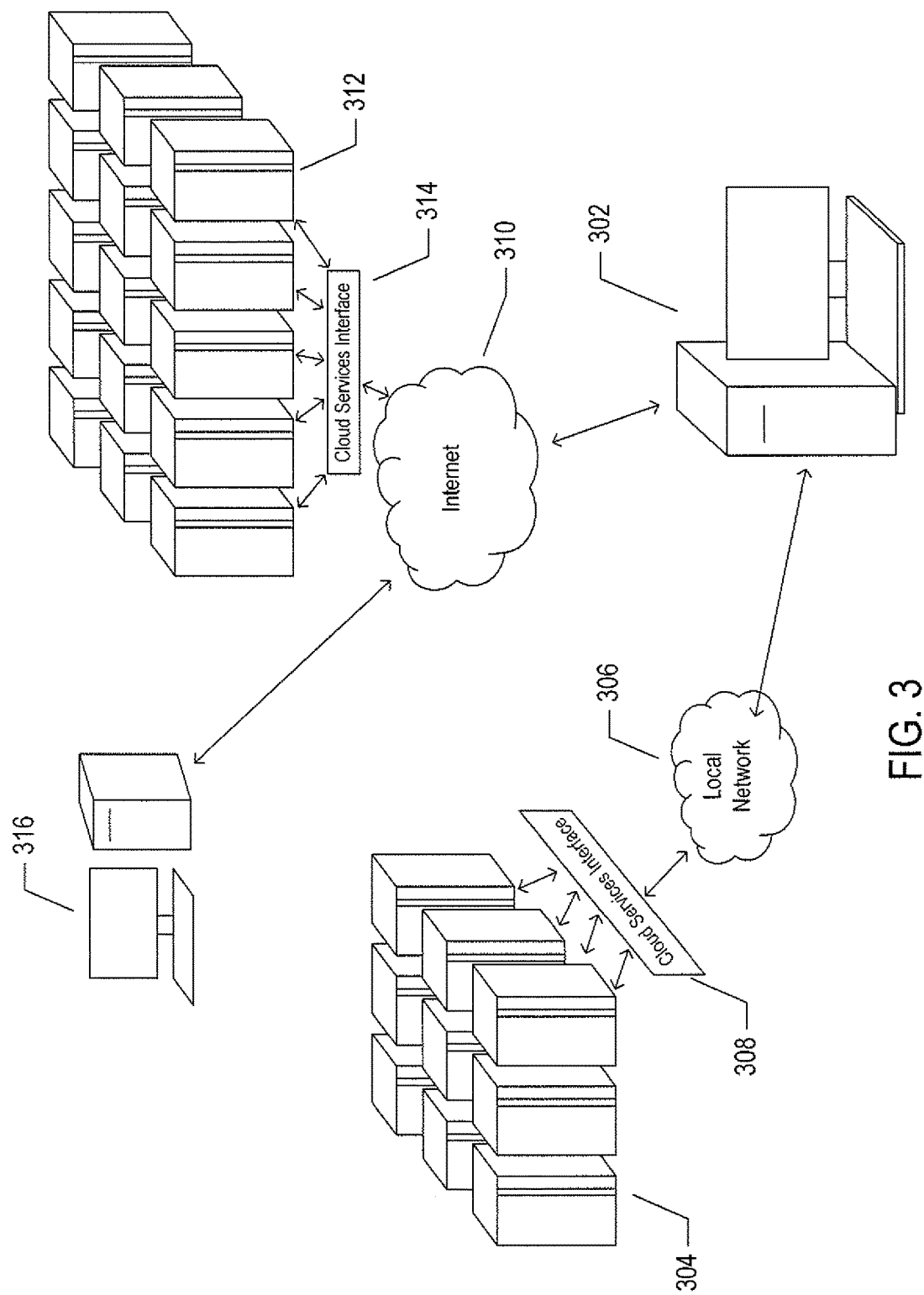
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
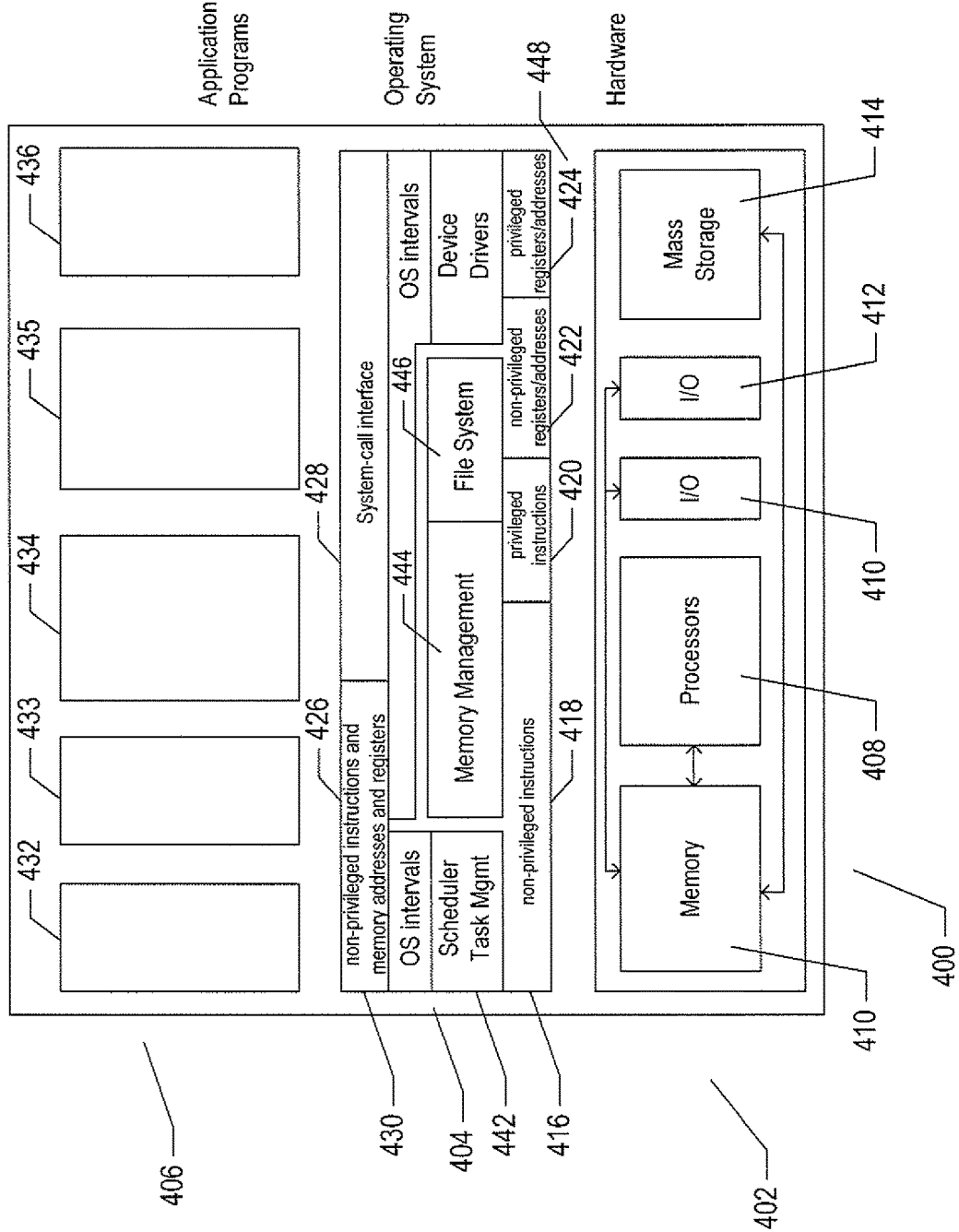
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
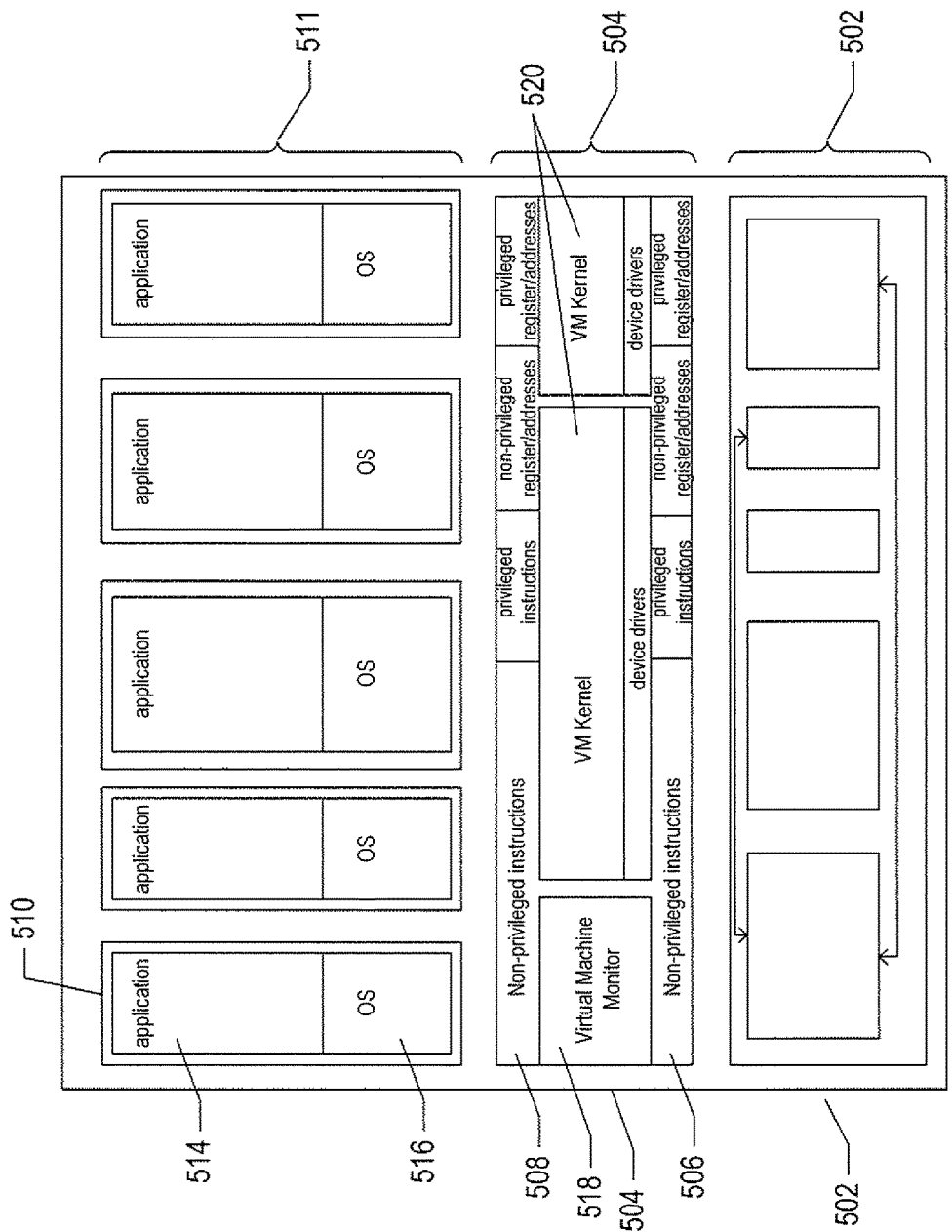
FIGS. 5A-5B show two types of virtual machine and virtual-machine execution environments.
Figure 5B:
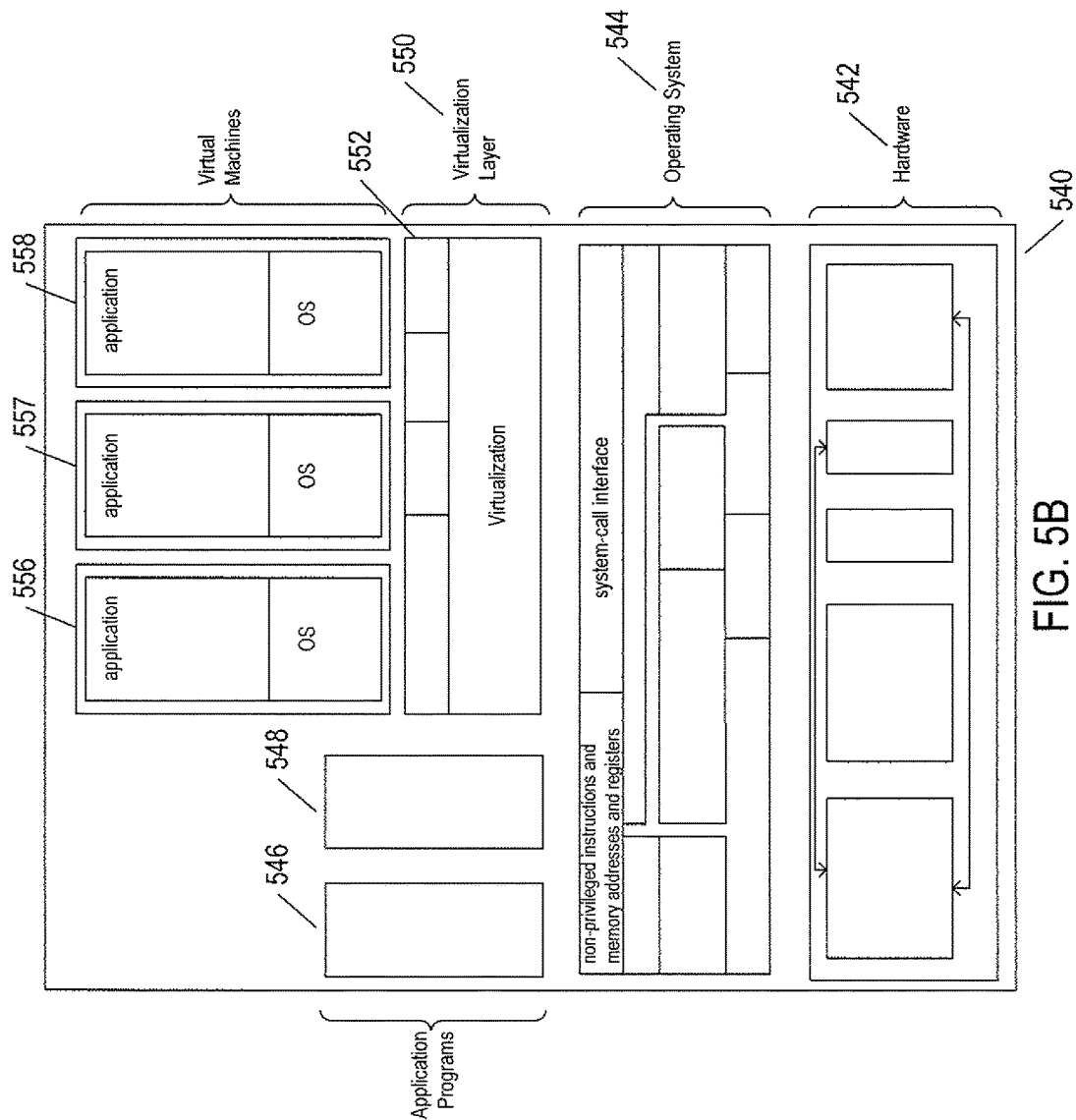

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4.

Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
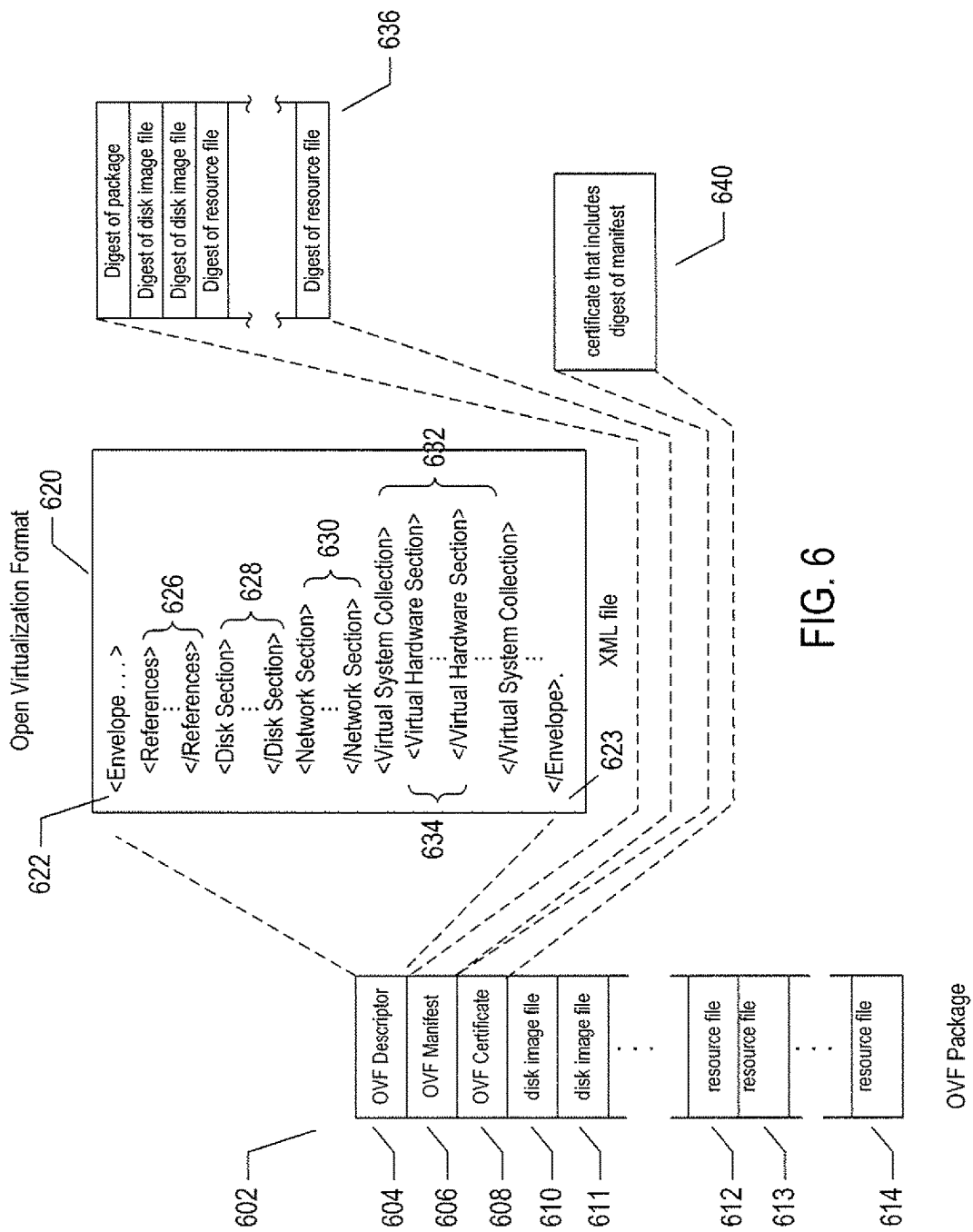
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
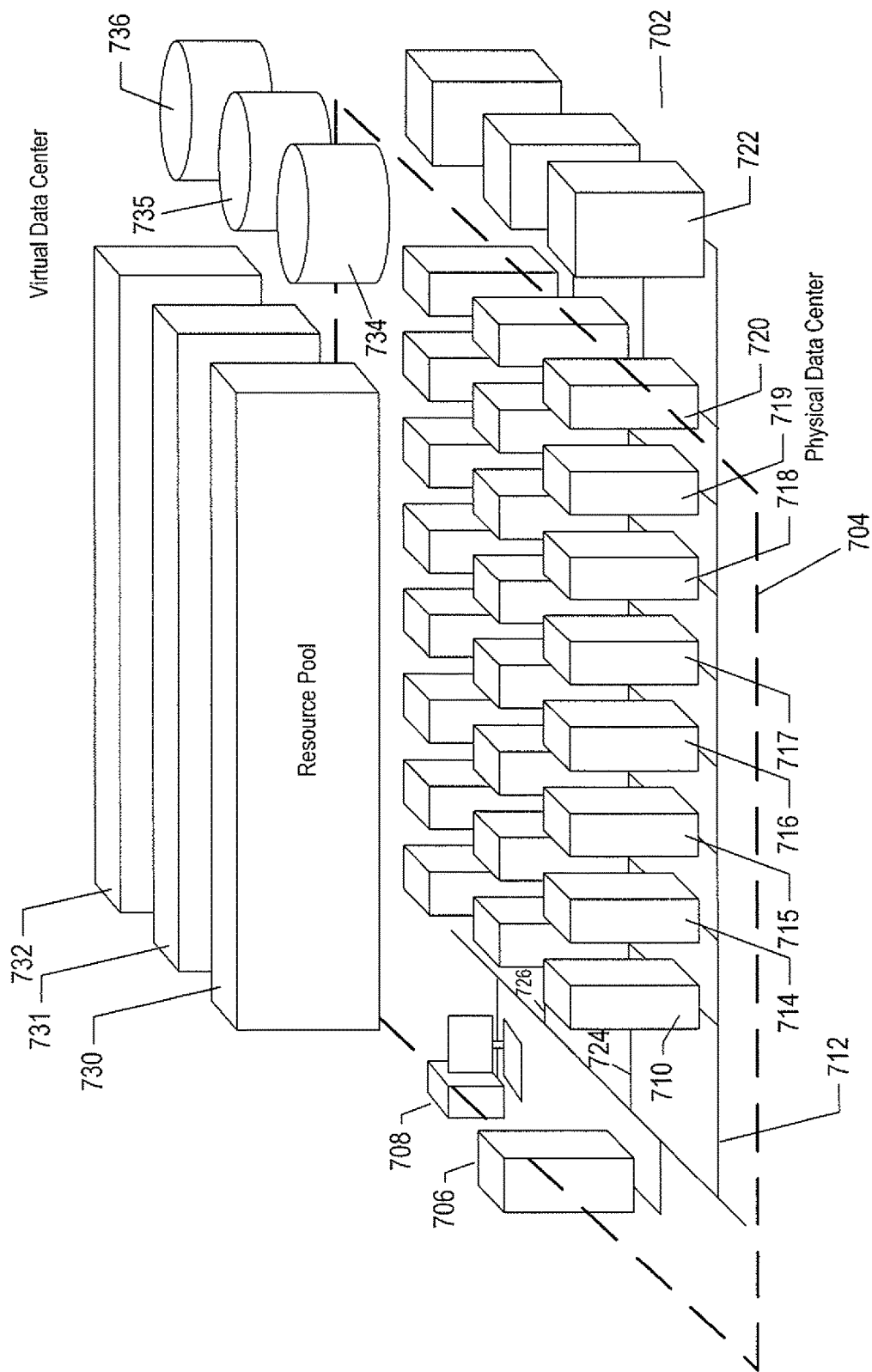
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
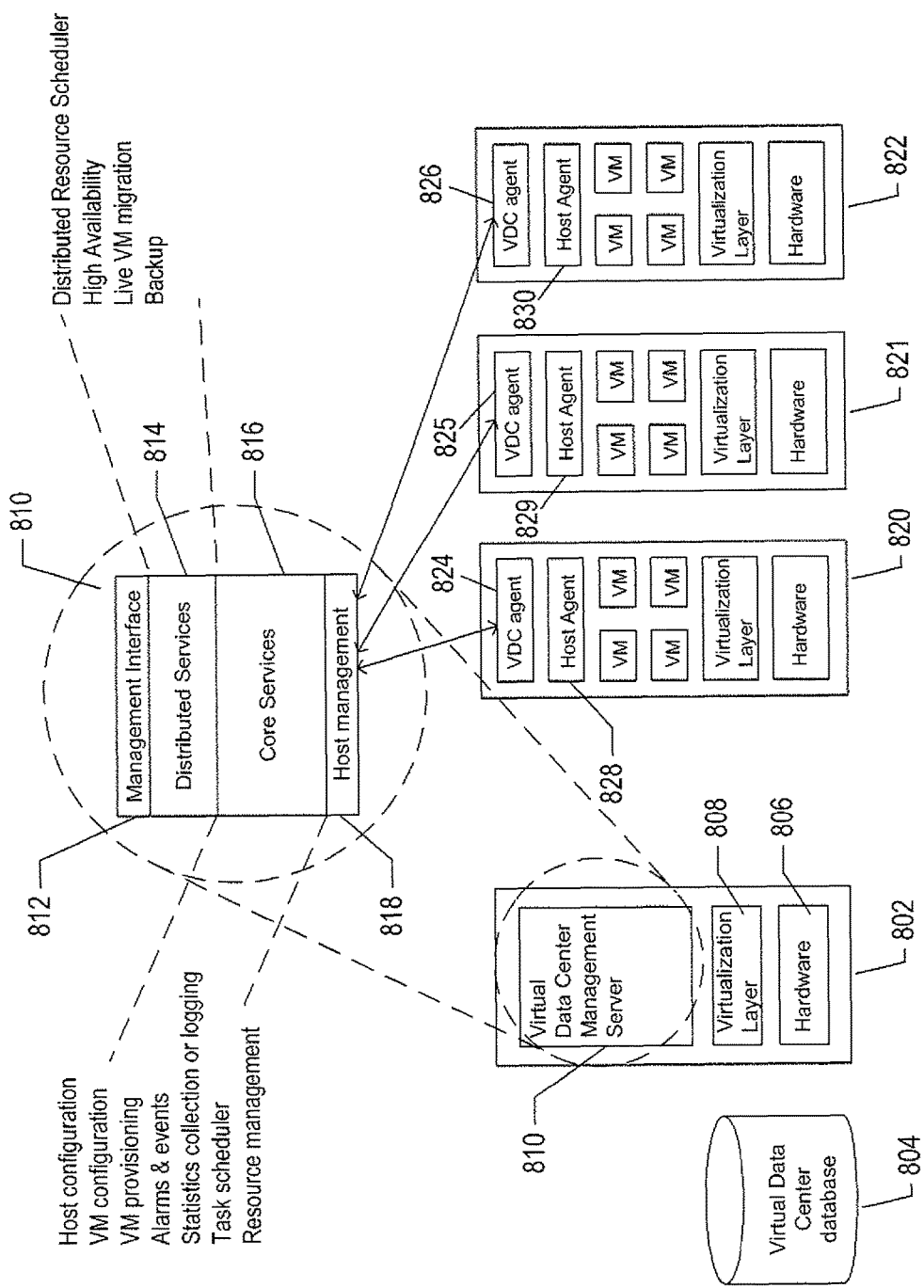
FIG. 8 shows virtual-machine components of a virtual-data-center management server and physical servers of a physical data center.

FIG. 8 shows virtual-machine components of a virtual-data-center management server and physical servers of a physical data center above which a virtual-data-Center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server VM 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
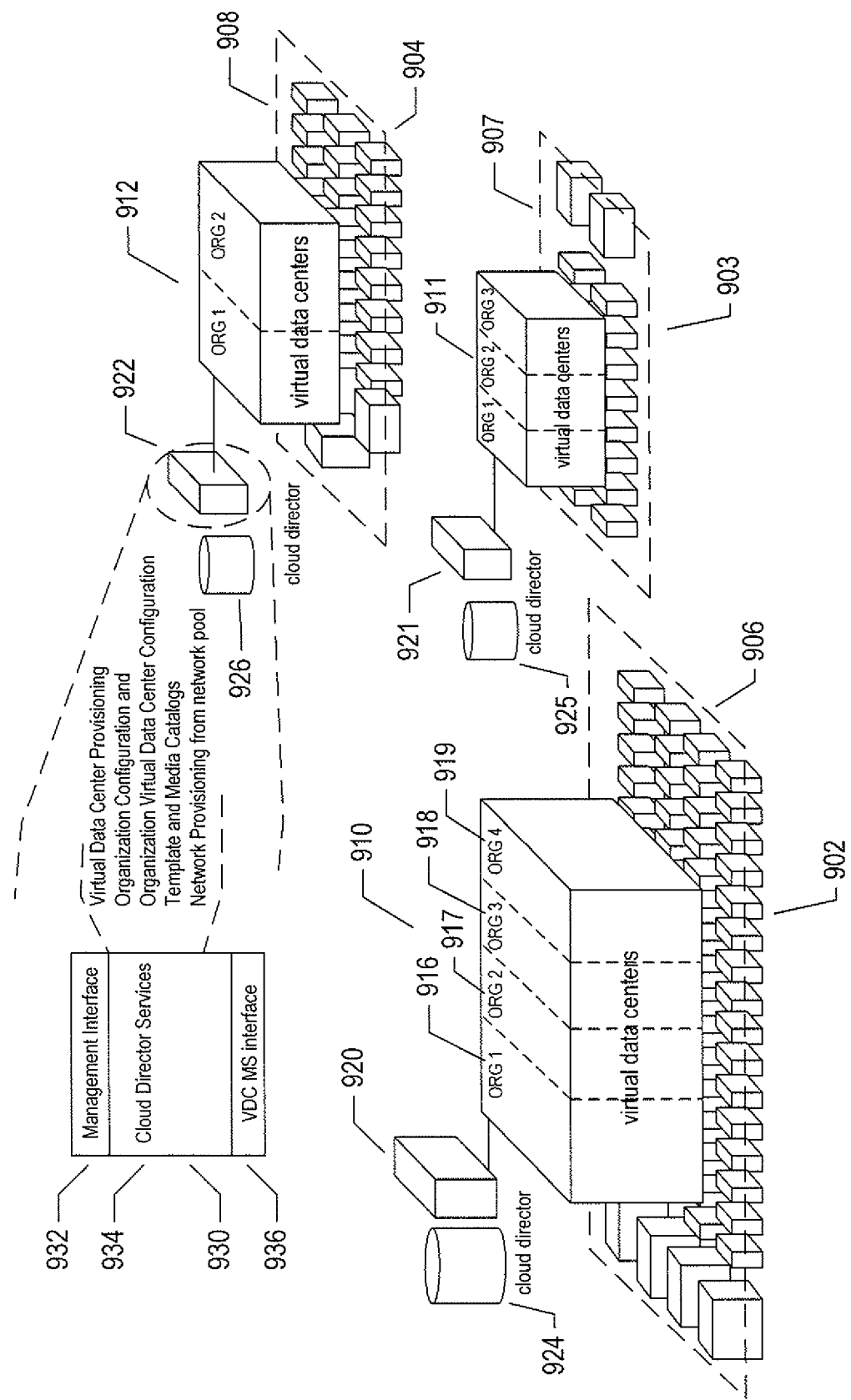
FIG. 9 shows a cloud-director level of abstraction.

FIG. 9 shows a cloud-director level of abstraction. In FIG. 9, three different physical data centers 902-904 are shown below planes representing the cloud-layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
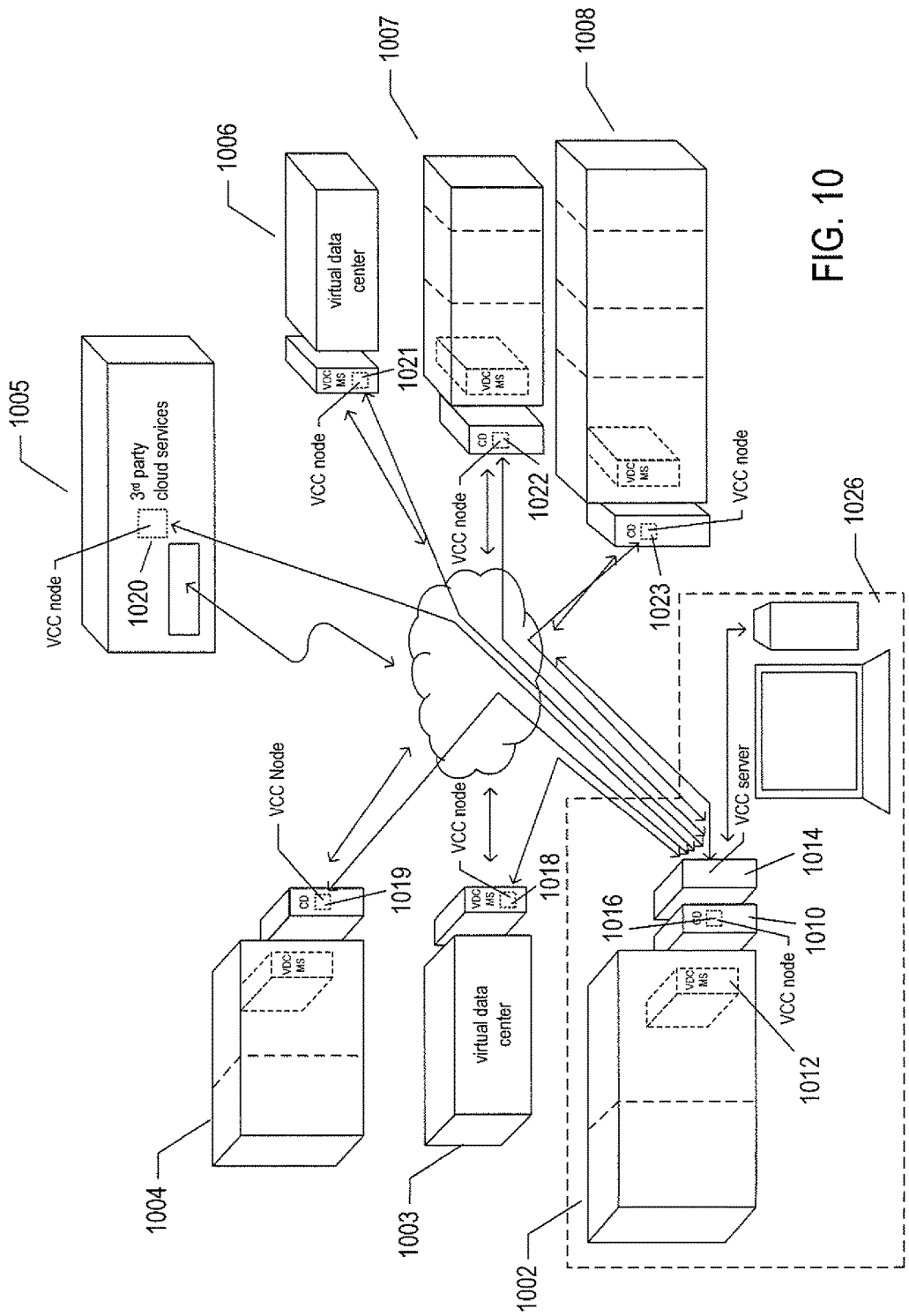
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
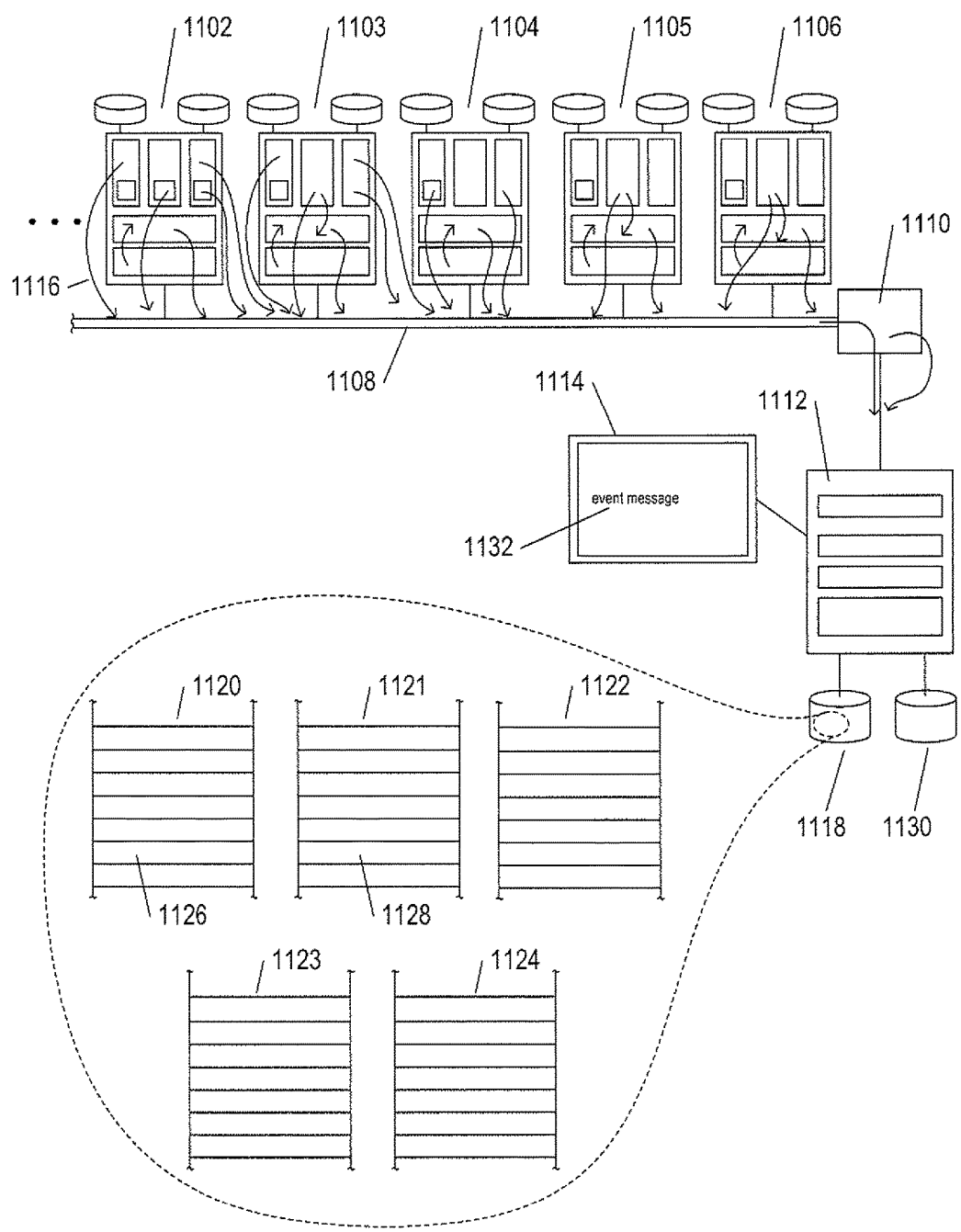
FIG. 11 shows an example of logging of event messages in event-log files.

Methods and Systems to Identify Log Write Instructions of a Source Code as Potential Sources of an Event Message of Interest FIG. 11 shows an example of logging of event messages in event-log files. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102-1106 as well as the communications bridge/router 1110 generate event messages that are transmitted to the administration computer 1112. Event messages may be generated by application programs, operating systems, VMs, guest operating systems, and other computer programs running on the computer systems 1102-1106 and the bridge/router 1110. Event messages may be relatively directly transmitted from a component within a discrete computer system to the administration computer 1112 or may be collected at various hierarchical levels within a discrete computer system and then forwarded from an event-message-collecting entity within the discrete computer system to the administration computer 1112. The administration computer 1112 collects and stores the received event messages in a data-storage device or appliance 1118 as event-log files 1120-1124. Rectangles, such as rectangles 1126 and 1128, represent individual event messages. For example, event-log file 1120 comprises a list of event messages generated within the computer system 1102. The various different source codes of the application programs, operating systems, VMs, guest operating systems, and other computer programs running on the computer systems 1102-1106 may be stored in a second data-storage device or appliance 1130. A source code may be a collection or set of computer instructions written using a human-readable computer language (i.e., human-readable alphanumeric characters), such as C, C++, and Fortran, usually as ordinary text and may also be a machine code. In other words, the second data-storage device 1130 is a source code repository in which the comments, statements, and computer instructions of the source codes of the application programs, operating systems, VMs, guest operating systems, and other computer programs running on the computer systems 1102-1106 and the bridge/router 1110 are stored. Each source code may be stored in a separate text file. Methods described below may be controlled and executed by the administration computer 1112 in order to identify one or more log write statements of a source code stored in the data-storage device 1130 that are potential sources of an event message of interest 1132 selected by a user.

Figure 12:
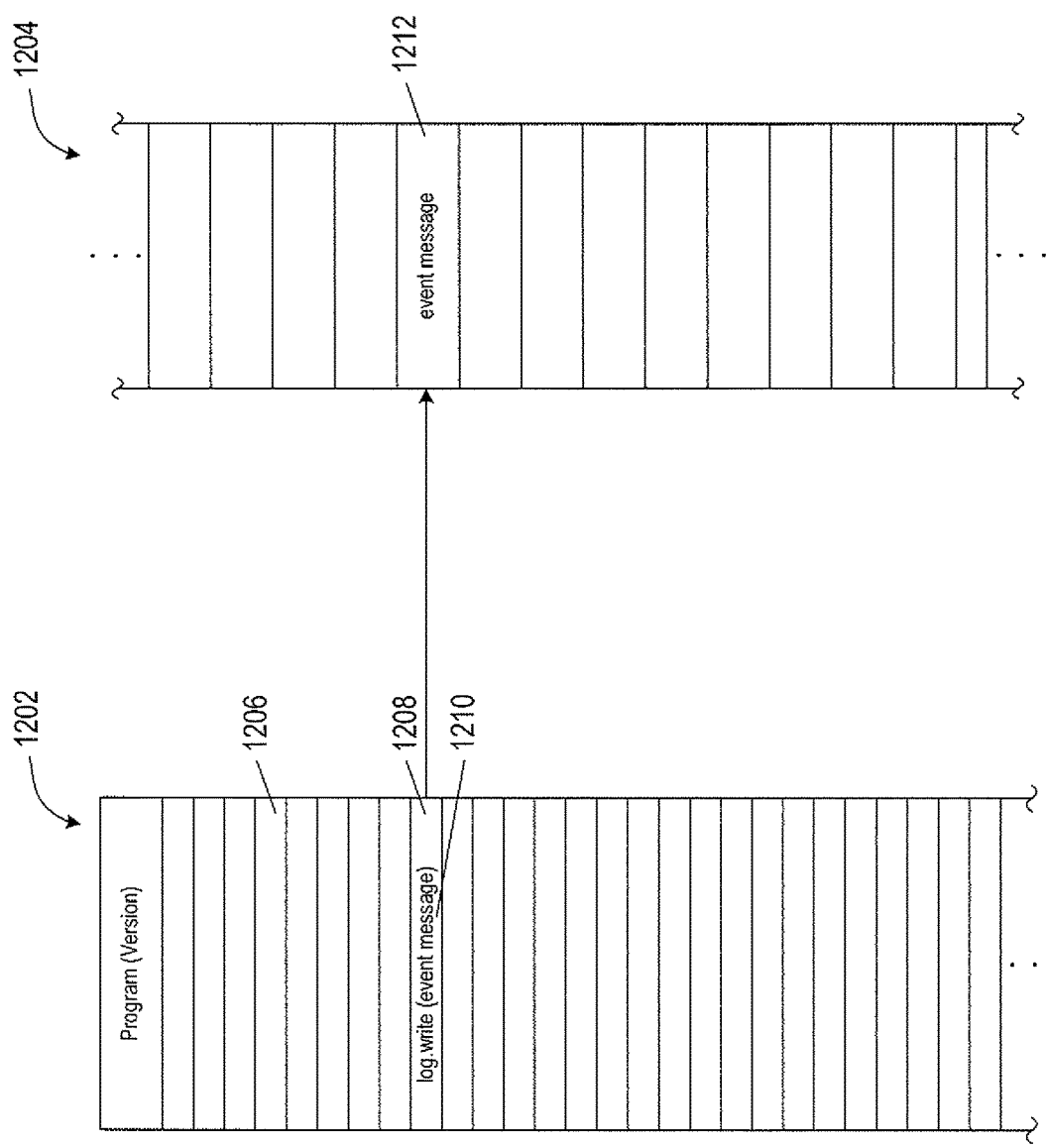
FIG. 12 shows an example of a source code and an example of a corresponding event-log file.

FIG. 12 shows an example of a source code 1202 and an example of a corresponding event-log file 1204. The source code 1202 may be the source code of an application program, an operating system, a VM, a guest operating system, or any other computer program or machine code. Rectangles, such as rectangle 1204, represent a definition, a comment, a statement, or a computer instruction that expresses some action to be executed by a computer. The source code 1202 includes log write instructions that generate event messages that are in turn written to the event-log file 1204. For example, source code 1202 includes an example log write statement 1206 that when executed writes an event message 1212 to the event-log file 1204.

Note that in the following descriptions, the notation "log.write( )," is used as a general representation of a log write instruction, which, in practice, is different for different programming languages. For the sake of simplicity, in this disclosure log write instructions include only the event message. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of application program or operating system and version) and the name of the event-log file to which the event message is written. Log write instructions are written in a source code by the developer of an application program or operating system in order to record events that occur while an operating system or application program is running. For example, a developer may include log write instructions that are executed when certain events occur, such as failures, logins, or errors. The log write instructions generate event messages that are recorded in an event-log file.

Figure 13:
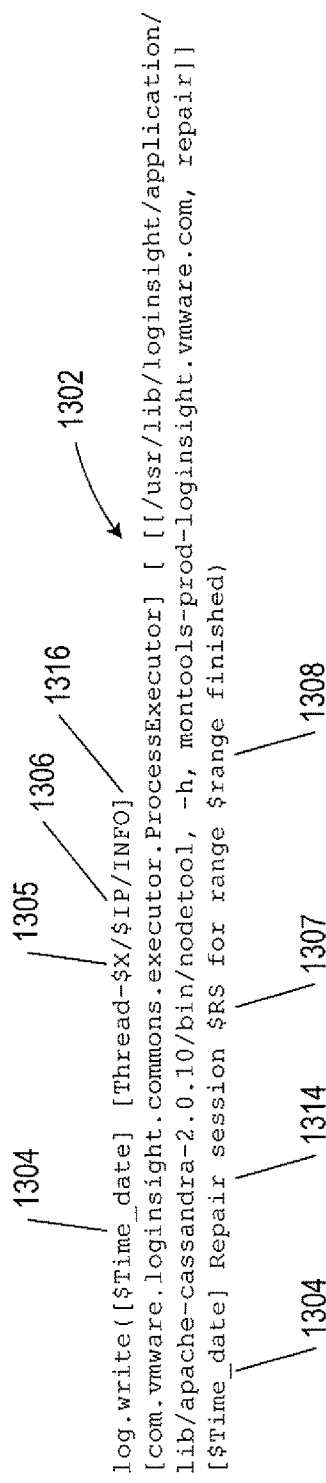
FIG. 13 shows an example of a log write instruction.

FIG. 13 shows an example of a log write instruction 1302. In the example of FIG. 13, the log write instruction 1302 includes arguments identified with "$." For example, the log write instruction 1302 includes two time-stamp arguments 1304, a thread number argument 1305, an internet protocol ("IP") address argument 1306, repair session argument 1307, and numerical range arguments 1308. The example log write instruction 1302 also includes text strings and natural-language words and phrases that identify the type of event that triggered the log write instruction, such as "Repair session" 1314. The text strings between brackets "[ ]" represent file-system paths, such as path 1308. When the log write instruction 1302 is executed, parametric values are assigned to the arguments and the text strings and natural-language words and phrases are recorded as an event message in an event-log file.

Figure 14:
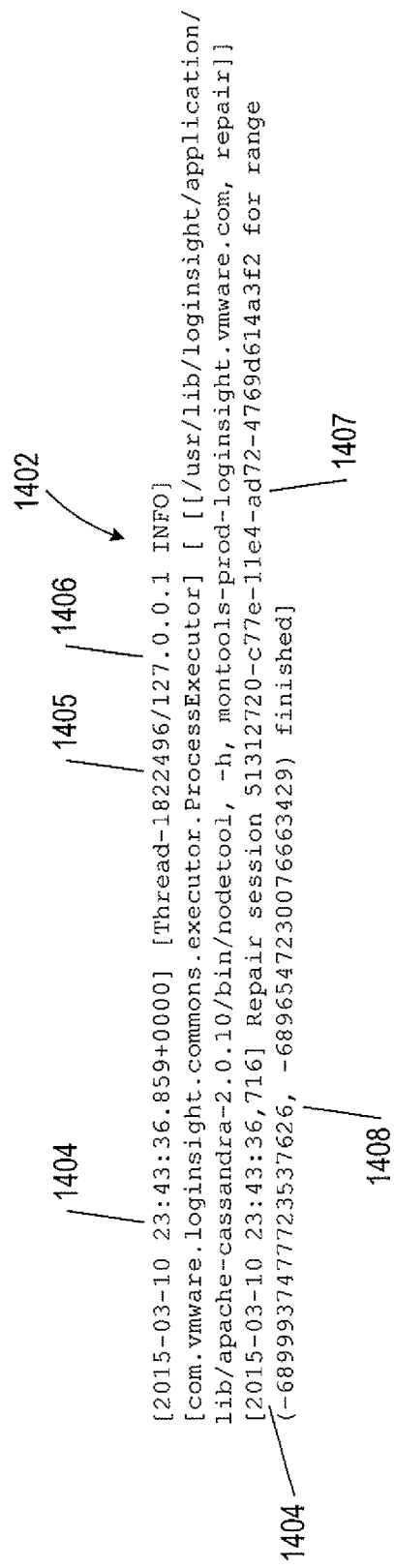
FIG. 14 shows an example of an event message created by the log write instruction of FIG. 13.

FIG. 14 shows an example of an event message 1402 created by the log write instruction 1302. The arguments of the log write instruction 1302 are assigned numerical parameters that are recorded in the event message 1402 at the time the event message is written to the event-log file. For example, the time stamp, thread, IP address, repair session, and range arguments 1304-1308 of the log write instruction 1302 are assigned corresponding numerical parameters 1404-1408 in the event message 1402. The time stamp 1404, in particular, represents the date and time the event message is generated. The text strings and natural-language words and phrases of the log write instruction 1302 also appear in the event message 1402 as stated in the log write instruction 1302.

FIG. 15 shows a small, eight-entry portion of an event-log file 1502. In FIG. 15, each rectangular cell, such as rectangular cell 1504, of the portion of the event-log file 1502 represents a single stored event message. For example, event message 1502 includes a short natural-language phrase 1506, date 1508 and time 1510 numerical parameters, as well as a numerical parameter 1512 that appears to identify a particular host computer.

In order to determine the source of any issues that may have occurred during run time of an operating system, VM, or application program, a source code developer, or another information technology ("IT") operations manager, may attempt to perform root cause analysis by examining event messages in an event-log file. The developer or operations manager may identify a particular event message and want to learn the location of the log write instruction that generated the event message in order to investigate the surrounding source code for the source of the issue. Source code statements and instructions may also include information about the developer, such as the name of the developer. As a result, by identifying the source code surrounding a particular log write statement, an operations manager may be able to identify and consult the developer who wrote the source code. However, because source codes typically comprise many thousands of different log write statements, attempts to sift through many thousands if not millions of source code statements and instructions in order to locate the particular log write statement that generated the event message of interest is extremely time consuming and error prone, potentially leading to identification of an incorrect log write instruction.

Once an event message of interest has been selecting for locating potential log write instructions of the source code, methods perform event-type analysis on the event message by discarding punctuation, parentheses, brackets, and numerical parameters. In other words, event-type analysis is performed to reduce an event message of interest to text strings and natural-language words and phrases.

Figure 16:
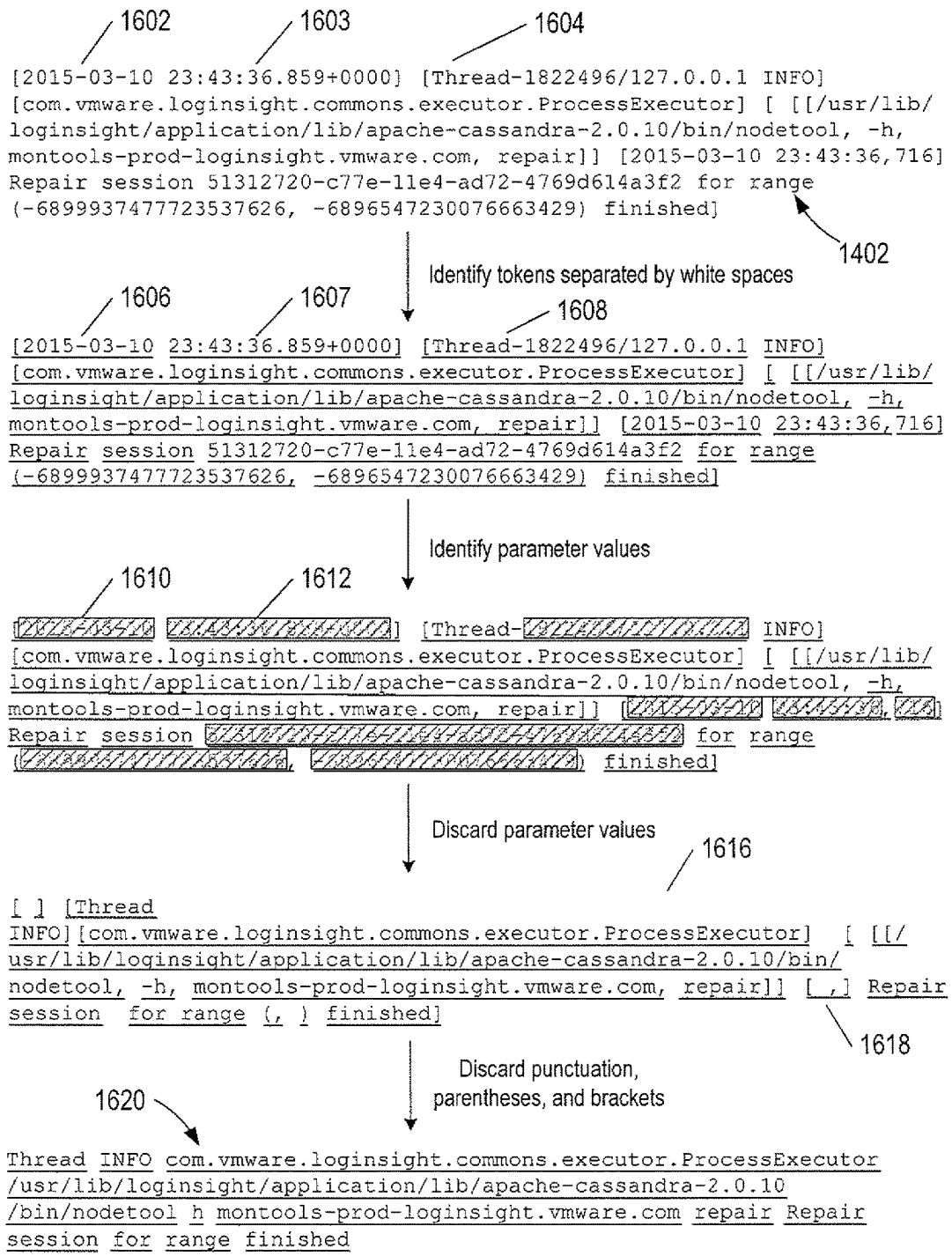
FIG. 16 shows an example of event-type analysis performed on an event message.

FIG. 16 shows an example of event-type analysis performed on the event message 1402, shown in FIG. 14. The event message 1402 is first tokenized by considering the event message as comprising tokens separated by non-printed characters, referred to as "white space." In FIG. 16, this initial tokenization of the event message 1402 is illustrated by underlining of the printed or visible characters. For example, the date 1602, time 1603, and thread 1604 at the beginning of the text contents of the event message 1402, following initial tokenization, become a first token 1606, a second token 1607, and a third token 1608, as indicated by underlining.

Next, a token-recognition pass is made to recognize any of the initial tokens as various types of parametric values. Parametric values are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parametric values include global unique identifiers ("GUIDs"), hypertext transfer protocol status values ("HTTP statuses"), universal resource locators ("URLs"), network addresses, and other types of common information entities that identify variable aspects of a type of event. By contrast, the phrase "Repair session" in event message 1402 likely occurs within each of a large number of repair session event messages. In FIG. 16, the parametric-valued tokens in the event message following initial token recognition are indicated by shading. For example, initial token recognition determines that the first token 1606 is a date and the second token 1607 is a time. The tokens identified as parametric values are identified by shaded rectangles, such as shaded rectangle 1610 of the date 1606 and shaded rectangle of 1612 of the time 1607. The parametric-valued tokens are discarded leaving the non-parametric text strings, natural language words and phrases, punctuation, parentheses, and brackets.

Various types of symbolically encoded values, including dates, times, machine addresses, network addresses, and other such parametric values can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parametric value. The currently described methods and systems do not depend on absolute precision and reliability of the event-message-preparation process. Occasional misinterpretations generally do not result in mistyping of event messages and, in the rare circumstances in which event messages may be mistyped, the mistyping is most often discovered during subsequent processing.

In the implementation shown in FIG. 16, the event message 1402 is subject to textualization in which an additional token-recognition step of the non-parametric portions of the event message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized event message 1614 in FIG. 16. For example, brackets and a coma 1618 are underlined. The punctuation, parentheses, and brackets are discarded leaving a textualized event message of interest 1620 that comprises only the non-parametric text strings and natural language words and phrases of the original event message 1402.

FIG. 17 shows a table that list the non-parametric tokens of the textualized event message 1602. The non-parametric tokens are the non-parametric text strings and natural language words and phrases of the original event message 1402. Each of the non-parametric tokens are denoted by "P1," "P2," "P3," . . . , "P12."

Methods identify log write instructions of a source code and identify each of the log write instructions for one or more of the same non-parametric tokens as the event message of interest. A confidence score may be calculated for each of the log write instructions that have one or more non-parametric tokens in common with the event message of interest and may be ranked from most confident to least confident source of the event message of interest based on the confidence score.

Figure 18:
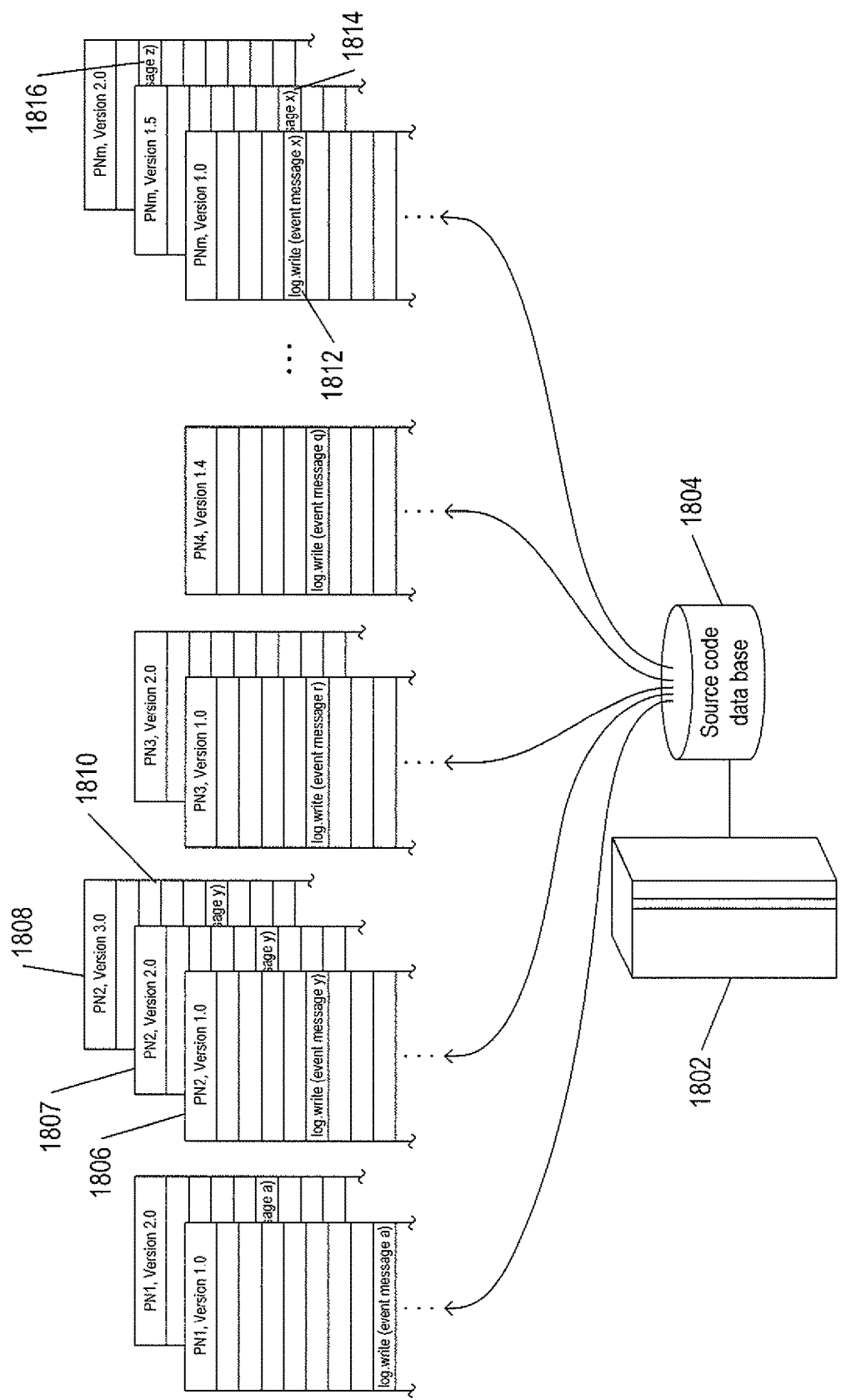
FIG. 18 shows an example of an administrative server computer in communication with a data-storage device or appliance used to store source codes.

Source codes of operating systems, application programs, VMs, guest operating systems, and other computer programs running in a data center are typically stored in a ounce code data base that serves as a source code repository. The source codes may be stored by source code name and version. FIG. 18 shows an example of an administrative server computer 1802 in communication with a data-storage device or appliance 1804. In the example of FIG. 18, the source codes of m operating systems, application programs, VMs, guest operating systems, and other computer programs running in a data center (not shown) are stored in the data-storage device 1804 as source code data base. The names of the m different operating systems, application programs, VMs, guest operating systems, and other computer programs are denoted by "PN1," "PN2," . . . , "PNm." The source code data base may also be used to store different versions of the source codes. For example, three different versions 1806-1808 of the source code PN2 are identified as Versions 1.0, 2.0, and 3.0, respectively. Version 1.0 may represent a first version of the source code PN2 followed by a second version 2.0 and a most recent version 3.0. Each subsequent version of the source may have been created to correct errors or make changes to a previous version. Each line of a source code is represented by a rectangle. For example, rectangle 1810 in source code PN2, Version 3.0 represents a comment, a statement or a computer instruction. Certain log write instructions of the source codes represented in FIG. 18 are identified. Note that the location of a log write instruction may change from version to version and may even be omitted in later versions. Later versions may also have log write statements that did not appear in previous versions. For example, the same log write instructions 1812 and 1814 of Versions 1.0 and 1.5, respectively, that generate an "event message x" of the source code PNm appear in different lines. In the latest Version 2.0 of the source code PNm, the log write instruction that generates an "event message x" is omitted and a different log write instruction 1816 that generates an "event message z" and does not appear in the previous Versions 1.0 and 1.5 has been added.

Figure 19:
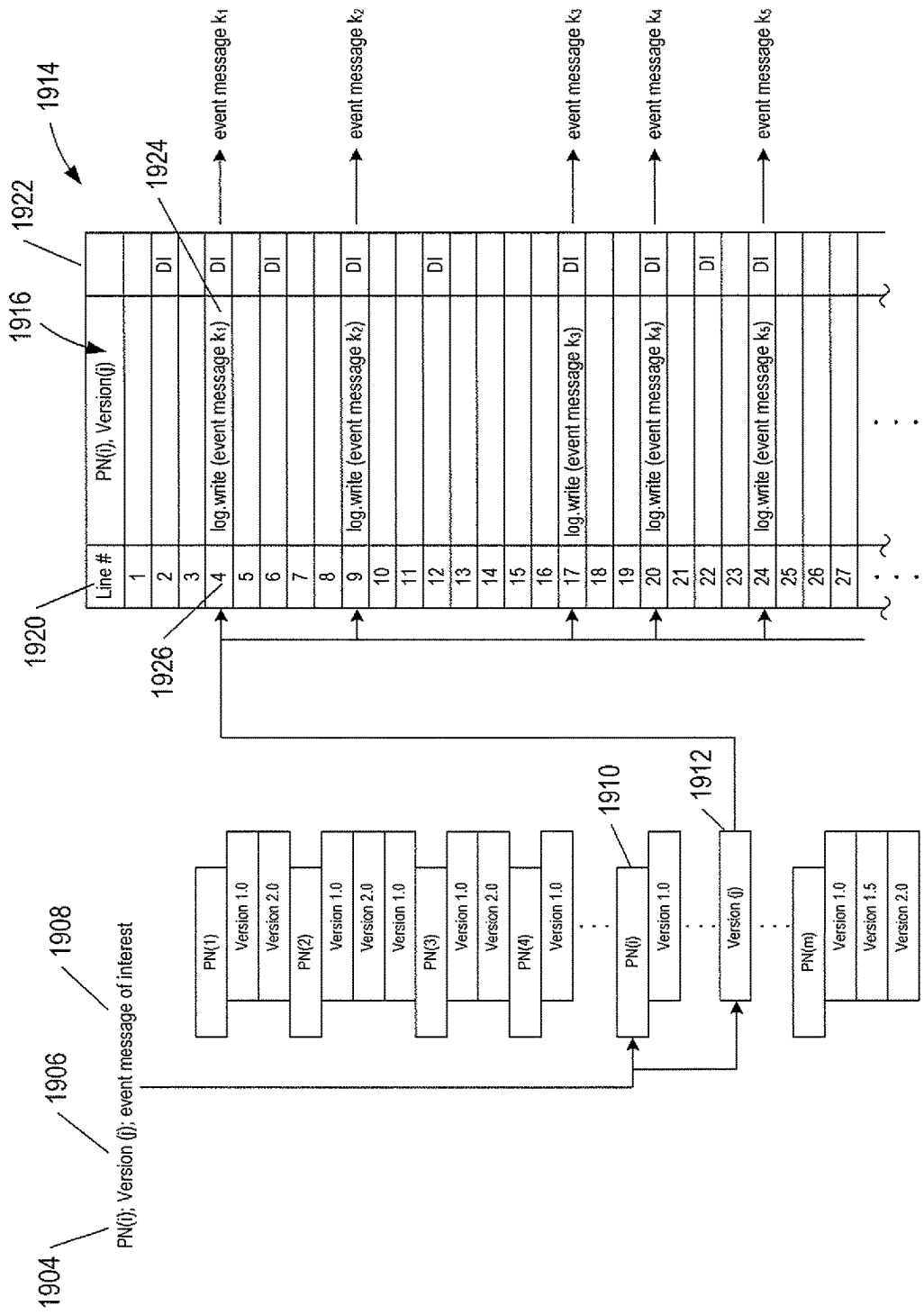
FIG. 19 shows an example list of source code names and versions stored in a source code data base.

In order to narrow a search for candidate log write instructions that may have generated an event message of interest, the source code name and version may also be provided as input. FIG. 19 shows an example list 1902 of source code names and versions stored in the source code data base. A developer, operations manager, or user inputs a source code name PN(i) 1904, Version (j) 1906, and an event message of interest 1908. The list of source codes names may be searched in order to identify the source code name 1910 that corresponds to the input source code name PN(i) 1904. The list of different versions of the source code may be searched in order to identify the source code Version (j) 1912 that corresponds to the input Version (j) 1906. A source code 1914 with the source code name PN(i) and Version (j) is located in the source code data base. Source codes may be stored such that each line of the source code is numbered and certain lines may also include information about the developer who wrote the line of code. Each rectangle in column 1916 of the source code 1914, such as rectangle 1918, represents a separate line of the source code, such as a comment, a statement, or a computer instruction. Column 1920 lists the line numbers associated with each line of the source code. Column 1922 lists developer information known about certain lines of the source code. Lines of the source code in which information about the developer who wrote the line of source code or lines of surrounding source code are identified by "DI." For example, a log write instruction 1924 is located at line number "4" 1924 and information about the developer is also provided. The developer information may include one or more names of the developers and date the line of code was written or last updated. Methods identify each log write instruction as a candidate log write instruction. For example, each line of the source code 1914 may be searched for the function "log-.write( )." Each line that contains a log write instruction is considered a candidate log write instruction and may be subjected to event-type analysis described above with reference to FIG. 16 in order to identify the non-parametric tokens (i.e., text strings and natural language words and phrases) of the event message of the candidate log write instruction. For example, in FIG. 19, event messages of the candidate log write instructions are denoted by $k_1$, $k_2$, $k_3$, $k_4$, and $k_5$ and are extracted from the corresponding candidate log write instructions of the source code 1914. The non-parametric tokens of the event messages of the candidate log write instructions may be determined in the same manner as the non-parametric tokens of the event message of interest described above with reference to FIG. 16.

FIGS. 20A-20E show examples of the event messages $k_1$, $k_2$, $k_3$, $k_4$, and $k_5$ shown in FIG. 19. The non-parametric tokens of the event message of the candidate log write instructions that correspond to the non-parametric tokens of the event message of interest 1402 listed in the table shown in FIG. 17 are outlined and identified by the reference parameters P1, P2, P3, P4, and P5. Characters of other text strings and natural language words and phrases that do not correspond to the non-parametric tokens of the event message of interest 1402 are denoted by "#." The reference parameters P1, P2, P3, P4, and P5 of the non-parametric tokens of the event message candidates in FIGS. 20A-20E correspond to the reference parameters of the non-parametric tokens of the event message of interest 1402 listed in the table shown in FIG. 17. In FIG. 20A, non-parametric tokens identified by circled reference parameters P1, P3, P10, and P12 match the non-parametric tokes of the event message interest identified by the reference parameters P1, P3, P10, and P12 in the table of FIG. 17.

Text matching may be used to identify which non-parametric tokens of an event message candidate correspond to the non-parametric tokens of the event message of interest. The number of matching non-parametric tokens between an event message candidate and the event message of interest may be counted as follows:

$$\text{mathcing token count} = \sum_{p,q} \text{token}_{EMI}(p) \cap \text{token}_{EMC}(q) \quad (1)$$

where $\text{token}_{EMI}(p)$ is a non-parametric token of the textualized event message of interest;

$\text{token}_{EMC}(q)$ is a non-parametric token of the textualized event message candidate; and $$\text{token}_{EMI}(p) \cap \text{token}_{EMC}(q) = \begin{cases} 1 & \text{token}_{EMI}(p) = \text{token}_{EMC}(q) \\ 0 & \text{token}_{EMI}(p) \neq \text{token}_{EMC}(q) \end{cases}$$

A confidence score for an event message candidate may be calculated as follows:

$$\text{confidence score} = \frac{\text{mathcing token count}}{P} \quad (2)$$

where P is the number of non-parametric tokens of the event message of interest.

In FIGS. 20A-20E, examples of confidence scores are provided for each of the event message candidates. The number of non-parametric tokens of the event message of interest is twelve (i.e., P=12). A confidence score of 0.33 is determined for the event message candidate represented in FIG. 20A. A confidence score of 0.75 is determined for the event message candidate represented in FIG. 20B.

The log write instructions that correspond to the event message candidates may be rank order according to the confidence scores associated with the event message candidates. A table displayed in a graphical user interface may be used to list the confidence scores, line numbers of the candidate log write instructions, source code names, versions, any developer information, and may include links that lead to the line numbers of the source code stored in the source code data base.

FIG. 21 shows an example table with a graphical user interface 2102 that provides a list of confidence scores 2104, line numbers of the candidate log write instructions 2106, source code names, versions, developer information, and links 2108 for the candidate log write instructions in FIGS. 20A-20E. In this example, a user may click on a link, such as link 1, in order to call up a window that displays the lines of the source code surrounding line 9.

In other embodiments, weighted confidence scores may calculated for the event message candidates. A weighted confidence score may be calculated as follows:

$$\text{confidence score} = \frac{1}{P} \sum_{p,q} w_p \times (\text{token}_{EMI}(p) \cap \text{token}_{EMC}(q)) \quad (3)$$

where $w_p$ is a weight assigned to the non-parametric token $\text{token}_{EMI}(p)$ of the event message of interest.

FIG. 22 shows a table of example weights 2202 that may be assigned to non-parametric tokens of the event message of interest based on the type of token. Column 2204 list five different weights denoted by $w_1$, $w_2$, $w_3$, $w_4$, and $w_5$. Column 2206 list five different types of tokens associated with the weights. For example, single character tokens may be assigned the weight $w_1$. Common terms may be assigned the weight of $w_2$. The weight values may be determined according to the complexity of the types of non-parametric tokens and/or the relative frequency that certain tokens occur in event messages. For example, paths are a string of characters that define a path to a unique location in a file system and therefore may be expected to occur with a low frequency in event messages of an event-log file. By contrast, common terms, such as for, thread, info, disk, and IP address, are terms that may occur with high frequency in many event messages. As a result, the weight $w_4$ assigned to non-parametric tokens of paths is greater than the weight $w_2$ assigned to common terms. Special terms, such as failure, error, warning, and severe, may be assigned a weight $w_3$ that is greater than the weight $w_2$ assigned to common terms. Exceptionally long strings of N characters or more may also be unique to only certain event messages and may be assigned greater weight $w_5$ than the weight $w_2$ of common terms.

FIG. 23 shows an example assignment of the weights in the table of FIG. 22 to the non-parametric tokens of the event message of interest 1620 obtained in FIG. 16. Single character "h" 2302 is assigned the smallest weight $w_1$. Common terms, such as "Thread" 2304, "INFO" 2306, and "for" 2308, are assigned the same larger valued weight $w_2$. Unique string of characters 2310 is assigned the largest weight $w_5$.

Figure 24:
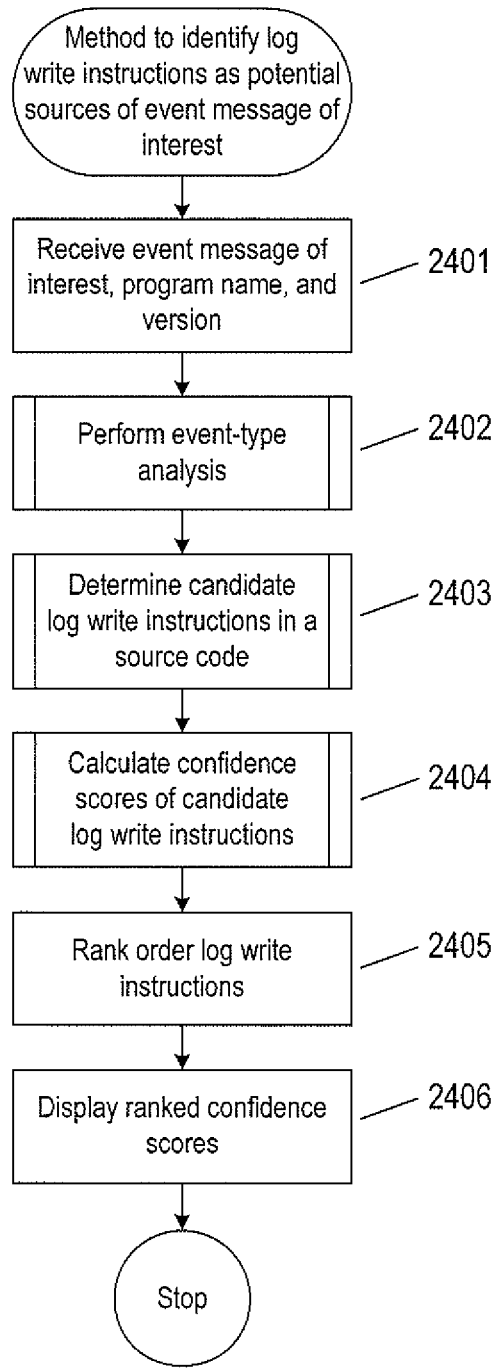
FIG. 24 shows a control-flow diagram of a method to identify log write instructions as potential sources of an event message of interest.

FIG. 24 shows a control-flow diagram of a method to identify log write instructions as potential sources of an event message of interest. In block 2401, an event message of interest, name of an application program or operating system, and version of the application program or operating system are received as input. In block 2402, a routine "perform event-type analysis" is called to identify non-parametric tokens of the event message of interest. In block 2403, a routine "determine candidate log write instructions in a source code" is called to identify log write instructions of the source code of the application program or operating system that are candidates for generating the event message of interest based on the non-parametric tokens of the event message of interest and name and version of the source code of the application program or operating system. In block 2404, a routine "calculate confidence scores of candidate log write instructions" is called to calculate confidence scores for each candidate log write instruction based on the non-parametric tokens of the event message of interest. In block 2405, the log write instructions may be rank ordered according to the associated confidence scores as described above with reference to FIG. 21. In block 2406, the rank order confidence scores, corresponding lines of source code are displayed in a graphical user interface that enables a user to identify where in the source code of the application program or operating system the candidate log write instructions are located.

Figure 25:
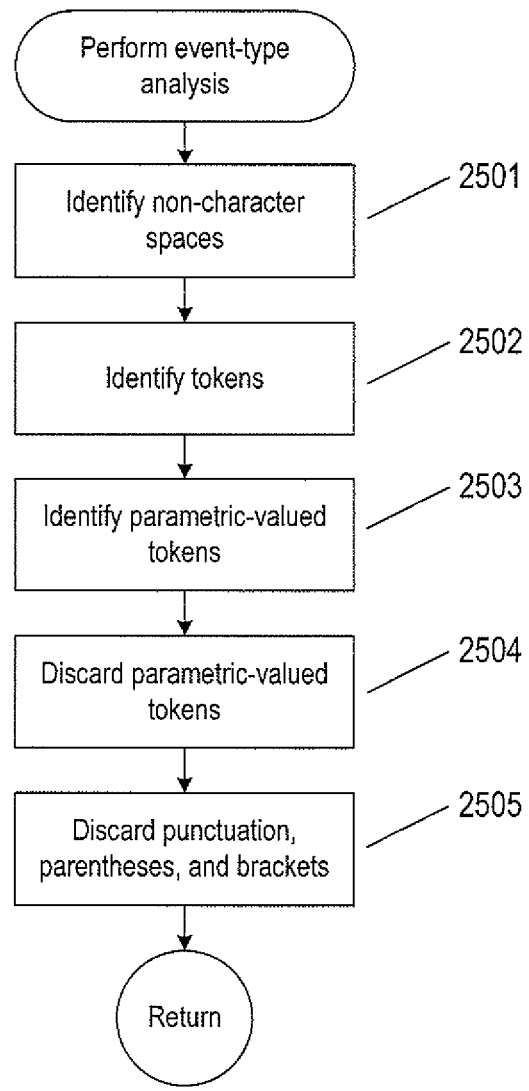
FIG. 25 shows a control-flow diagram of the routine "perform event-type analysis" called in FIG. 24.

FIG. 25 shows a control-flow diagram of the routine "perform event-type analysis" called in block 2402 of FIG. 24. In blocks 2501 and 2502, the event message of interest is tokenized by considering the event message as comprising tokens separated by non-printed characters or white spaces as described above with reference to FIG. 16. In block 2501, the non-printed characters or white spaces between printed or visible characters are identified. In block 2502, the tokens may be parametric and non-parametric printed or visible characters separated by the non-printed characters or white spaces. In block 2503, a token-recognition pass is made to identify any of the tokens as various types of parametric values. Parametric values are tokens or message fields that are likely to be highly variable over a set of messages of a particular type as described above with reference to FIG. 16. In block 2504, tokens identified as being parametric-valued tokens are discarded as described above with reference to FIG. 16. In block 2505, punctuation and separation symbols, such as parentheses and brackets, commas, and dashes that occur as separate tokens or that occur at the leading and trailing extremities of non-parametric tokens are identified and subsequently discarded, as described above with reference to FIG. 16.

Figure 26:
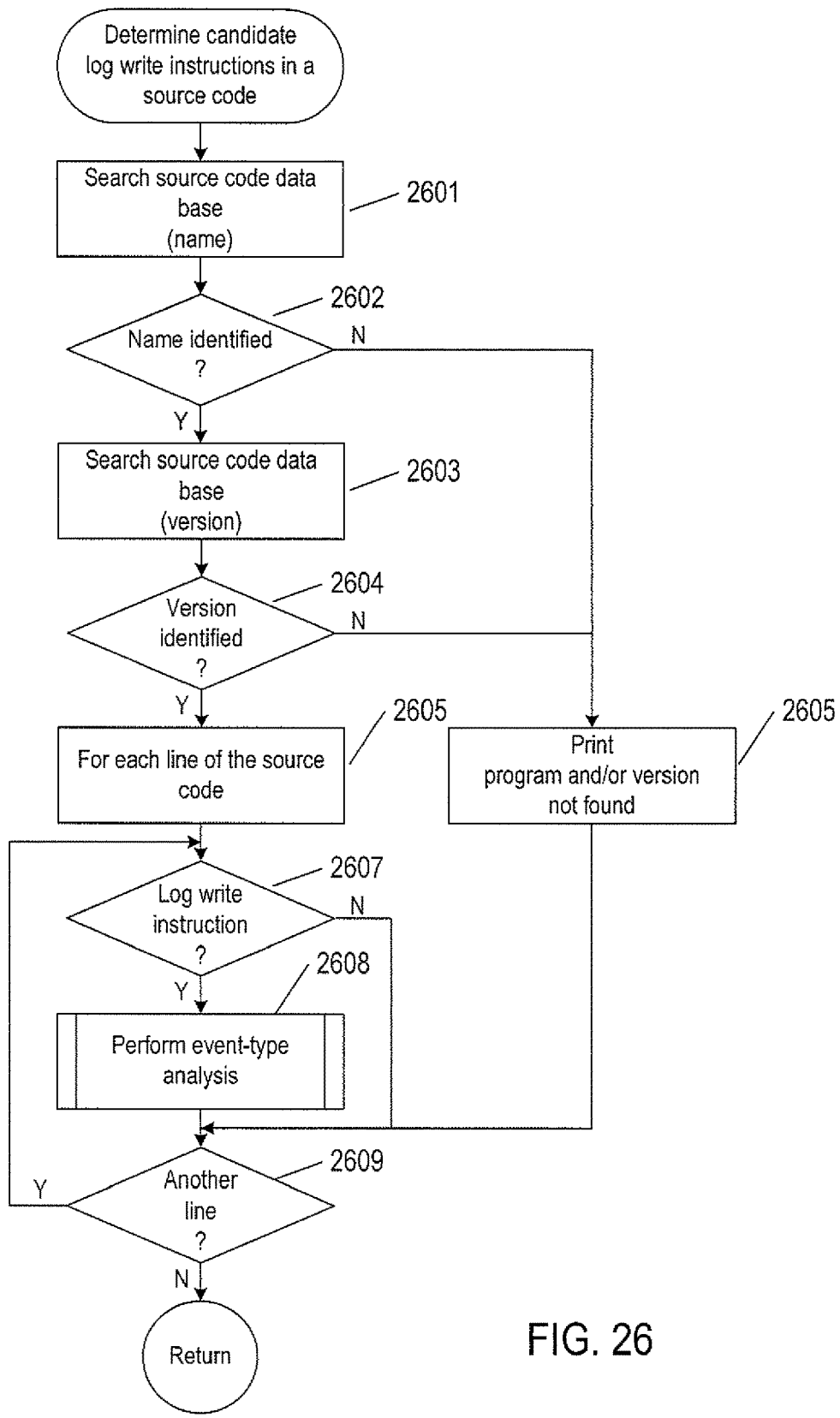
FIG. 26 shows a control-flow diagram of the routine "determine candidate log write instructions in a source code" called in FIG. 24.

FIG. 26 shows a control-flow diagram of the routine "determine candidate log write instructions in a source code" called in block 2403 of FIG. 24. In block 2601, the name of the application program or operating system is used to search a source code data base stored in a data-storage device or appliance for source codes having the same as the name of the application program or operating system as described above with reference to FIG. 19. In decision block 2602, when the name of the source code that corresponds to the name of the application program or operating system is found, control flows to block 2603. Otherwise, control flows to block 2605. In block 2603, the version of the application program or operating system is used to narrow the search to the corresponding version of the source code that generated the event message of interest as described above. In decision block 2604, when the name of the source code that corresponds to the name of the application program or operating system is found, control flows to block 2606. Otherwise, control flows to block 2605. In block 2605, a notice is generated indicating that the source code for the application program, operating system, or other computer program and/or version cannot be found in the source code data base. A loop beginning in block 2606, repeats the operations of blocks 2607 and 2608 for each line of the source code. In decision block 2607, when a log write instruction is identified, control flows to block 2608. In block 2608, the routine "event-type analysis" described above with reference to FIG. 25, is called to determine the non-parametric tokens of the log write instruction identified in block 2607, where the event message of the log write instruction replaces the event message of interest in the description of FIG. 25. In decision block 2609, blocks 2607 and 2608 are repeated for another line of the source code.

Figure 27:
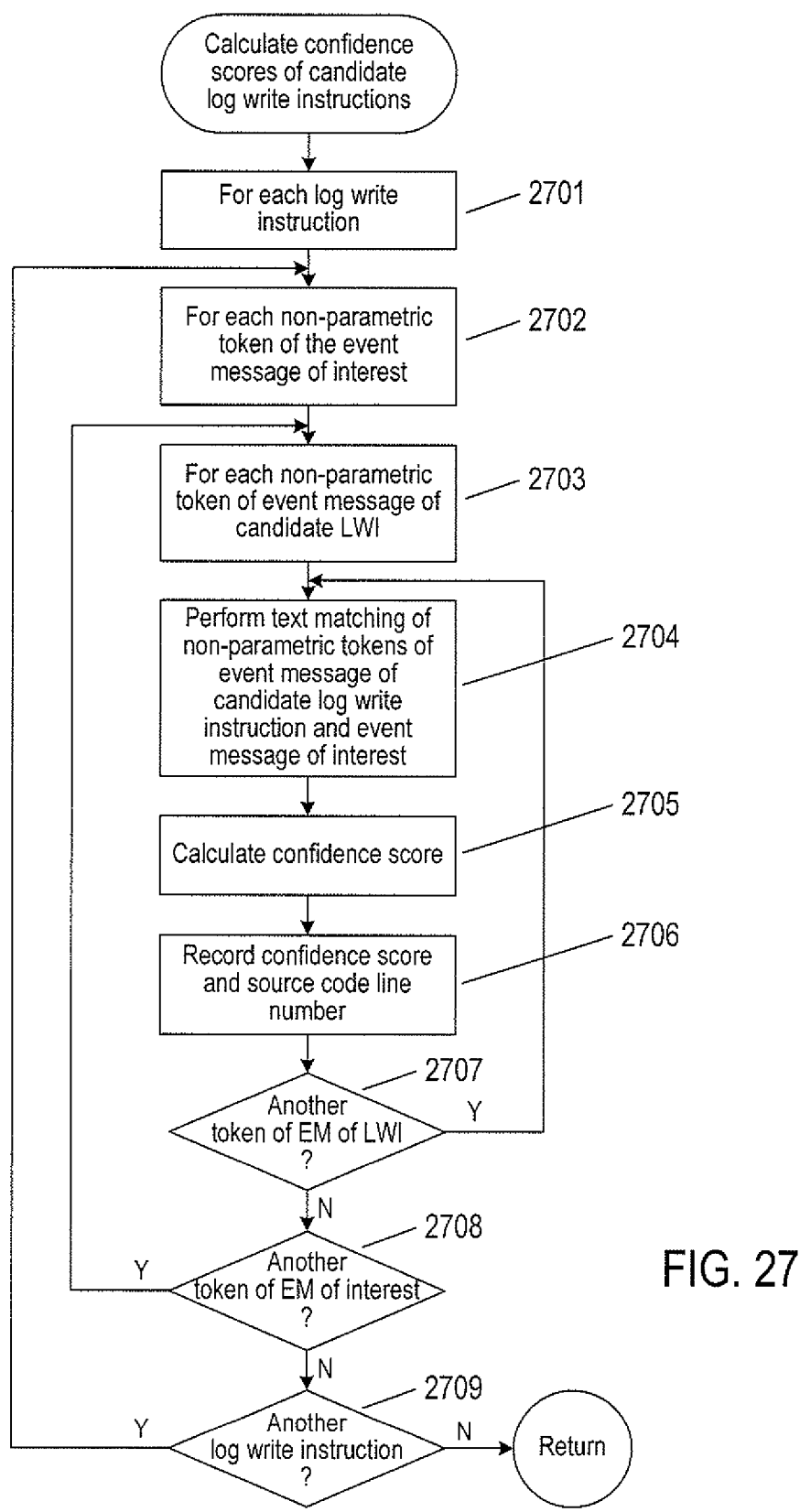
FIG. 27 shows a control-flow diagram of the routine "calculate confidence scores of candidate log write instructions" called in FIG. 24.

FIG. 27 shows a control-flow diagram of the routine "calculate confidence scores of candidate log write instructions" called in block 2404 of FIG. 24. A loop beginning with block 2701 repeats the operations of blocks 2702-2708 for each log write instruction. A loop beginning with block 2702 repeats the operations of blocks 2703-2707 for each of non-parametric tokens of the event message of interest. A loop beginning with block 2703 repeats the operations of blocks 2704-2706 for each of the non-parametric tokens of a candidate log write instruction. In block 2704, text matching between non-parametric tokens of the event message of the candidate log write instruction and the non-parametric tokens of the event message of interest is performed in order to determine which of non-parametric tokens are common to the candidate log write instruction and the event message of interest, as described above with reference to FIGS. 20A-20E. In block 2705, a confidence score is calculated by summing the number of text matched non-parametric tokens between the candidate log write instruction and the event message of interest divided by the number of non-parametric tokens of the event message of interest, as described above with reference to Equations (1) and (2). In other embodiments, in block 2705, the confidence scores may be weighted confidence scores calculated according to Equations (3). In block 2706, the confidence scores (or weighted confidence scores) source code lines numbers of the log write instructions are recorded. In decision block 2707, blocks 2704-2706 are repeated for another non-parametric token of the event message of the log write instruction. In decision block 2708, blocks 2703-2707 are repeated for another non-parametric token of the event message of interest. In decision block 2709, blocks 2702-2708 are repeated for another log write instruction.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors to identify log write instructions of a source code that are potential sources of an event message of interest, the method comprising:
   identifying non-parametric tokens of the event message of interest read from an event-log file stored in the one or more data-storage devices;
   determining one or more log write instructions and associated line numbers in a source code as candidates for generating the event message of interest based on a name and version of the source code;
   identifying non-parametric tokens of each event message of the one or more candidate log write instructions;
   for each of the one or more candidate log write instructions, calculating a confidence score based the number of non-parametric tokens the event message of interest and event message of the candidate log write instruction have in common;
   rank ordering the one or more candidate log write instructions based on the one or more confidence scores; and
   displaying rank ordered candidate log write instructions, confidence scores, and associated line numbers of the source code in a graphical user interface, the confidence score of each candidate log write instruction represents a level of confidence that each log write instruction in the source code is the source of the event message of interest.

2. The method of claim 1, wherein identifying the non-parametric tokens of the event message of interest comprises:
   identifying non-printed characters that separate parametric-valued and non-parametric tokens of the event message of interest;
   identifying parametric-valued tokens of the event message of interest;
   discarding the parametric-valued tokens of the event message of interest;

identifying punctuation and separation symbols of the event message of interest and of the non-parametric tokens of event message of interest; and discarding the punctuation and separation symbols leaving the non-parametric tokens of the event message of interest without punctuation and separation symbols.

3. The method of claim 1, wherein determining the one or more log write instructions and associated line numbers in the source code as candidates for generating the event message of interest comprises:

searching a source code data base stored in a data-storage device for one or more source codes having a name that is the same as the name of the source code;

searching the source code data base for a source code of the one or more source codes having a version that is the same as the version of the source code; and identifying candidate log write instructions and corresponding lines in the source code.

4. The method of claim 1, wherein identifying the non-parametric tokens of each of the one or more candidate log write instructions comprises:

for each of the one or more candidate log write instruction, identifying non-printed characters that separate parametric-valued and non-parametric tokens of the event message of the candidate log write instruction;

identifying parametric-valued tokens of the event message of the candidate log write instruction;

discarding the parametric-valued tokens of the event message of the candidate log write instruction;

identifying punctuation and separation symbols of the event message of interest and of the non-parametric tokens of event message of the candidate log write instruction; and discarding the punctuation and separation symbols leaving the non-parametric tokens of the event message of the candidate log write instruction without punctuation and separation symbols.

5. The method of claim 1, wherein calculating the confidence score for each of the one or more candidate log write instructions comprises:

for each candidate log write instruction, determining which non-parametric tokens of an event message of the candidate log write instruction and non-parametric tokens of the event message of interest are common to the candidate log write instruction and the event message of interest;

calculating a confidence score for each of the candidate log write instruction as a sum of a number of text matched non-parametric tokens of the event message of the candidate log write instruction and the event message of interest divided by a total number of non-parametric tokens of the event message of interest; and recording the confidence scores and lines numbers of the log write instructions in a data-storage device.

6. The method of claim 5, wherein calculating the confidence score comprising calculating a weighted confidence score based on different types of the non-parametric tokens of the event message of interest.

7. The method of claim 1, wherein displaying rank ordered candidate log write instructions and associated lines numbers of the source code in the graphical user interface further comprises providing one or more links, each link associated with one of the candidate log write statements that when clicked on displays lines of the source code surrounding the candidate log write instruction associated with the link.

8. A system to identify log write messages that are potential sources of an event message of interest, the system comprising:

one or more processors;

one or more data-storage devices; and machine-readable instructions stored in the one or more data-storage devices that when executed using the one or more processors controls the system to carry out identifying non-parametric tokens of the event message of interest read from an event-log file stored in the one or more data-storage devices;

determining one or more log write instructions and associated line numbers in a source code as candidates for generating the event message of interest based on a name and version of the source code;

identifying non-parametric tokens of each event message of the one or more candidate log write instructions;

for each of the one or more candidate log write instructions, calculating a confidence score based the number of non-parametric tokens the event message of interest and event message of the candidate log write instruction have in common;

rank ordering the one or more candidate log write instructions based on the one or more confidence scores; and displaying rank ordered candidate log write instructions, confidence score, and associated line numbers of the source code in a graphical user interface, the confidence score of each candidate log write instruction represents a level of confidence that each log write instruction in the source code is the source of the event message of interest.

9. The system of claim 8, wherein identifying the non-parametric tokens of the event message of interest comprises:

identifying non-printed characters that separate parametric-valued and non-parametric tokens of the event message of interest;

identifying parametric-valued tokens of the event message of interest;

discarding the parametric-valued tokens of the event message of interest;

identifying punctuation and separation symbols of the event message of interest and of the non-parametric tokens of event message of interest; and discarding the punctuation and separation symbols leaving the non-parametric tokens of the event message of interest without punctuation and separation symbols.

10. The system of claim 8, wherein determining the one or more log write instructions and associated line numbers in the source code as candidates for generating the event message of interest comprises:

searching a source code data base stored in a data-storage device for one or more source codes having a name that is the same as the name of the source code;

searching the source code data base for a source code of the one or more source codes having a version that is the same as the version of the source code; and identifying candidate log write instructions and corresponding lines in the source code.

11. The system of claim 8, wherein identifying the non-parametric tokens of each of the one or more candidate log write instructions comprises:

for each of the one or more candidate log write instruction,
identifying non-printed characters that separate parametric-valued and non-parametric tokens of the event message of the candidate log write instruction;
identifying parametric-valued tokens of the event message of the candidate log write instruction;
discarding the parametric-valued tokens of the event message of the candidate log write instruction;
identifying punctuation and separation symbols of the event message of interest and of the non-parametric tokens of event message of the candidate log write instruction; and
discarding the punctuation and separation symbols leaving the non-parametric tokens of the event message of the candidate log write instruction without punctuation and separation symbols.

12. The system of claim 8, wherein calculating the confidence score for each of the one or more candidate log write instructions comprises:
for each candidate log write instruction,
determining which non-parametric tokens of an event message of the candidate log write instruction and non-parametric tokens of the event message of interest are common to the candidate log write instruction and the event message of interest;
calculating a confidence score for each of the candidate log write instruction as a sum of a number of text matched non-parametric tokens of the event message of the candidate log write instruction and the event message of interest divided by a total number of non-parametric tokens of the event message of interest; and
recording the confidence scores and lines numbers of the log write instructions in a data-storage device.

13. The system of claim 12, wherein calculating the confidence score comprising calculating a weighted confidence score based on different types of the non-parametric tokens of the event message of interest.

14. The system of claim 8, wherein displaying rank ordered candidate log write instructions and associated lines numbers of the source code in the graphical user interface further comprises providing one or more links, each link associated with one of the candidate log write statements that when clicked on displays lines of the source code surrounding the candidate log write instruction associated with the link.

15. A non-transitory computer-readable medium encoded with machine-readable instructions that implement a method carried out by one or more processors of a computer system to perform the operations of
identifying non-parametric tokens of the event message of interest read from an event-log file stored in the one or more data-storage devices;
determining one or more log write instructions and associated line numbers in a source code as candidates for generating the event message of interest based on a name and version of the source code;
identifying non-parametric tokens of each event message of the one or more candidate log write instructions;
for each of the one or more candidate log write instructions, calculating a confidence score based the number of non-parametric tokens the event message of interest and event message of the candidate log write instruction have in common;
rank ordering the one or more candidate log write instructions based on the one or more confidence scores; and
displaying rank ordered candidate log write instructions, confidence score, and associated line numbers of the source code in a graphical user interface, the confidence score of each candidate log write instruction represents a level of confidence that each log write instruction in the source code is the source of the event message of interest.

16. The medium of claim 15, wherein identifying the non-parametric tokens of the event message of interest comprises:
identifying non-printed characters that separate parametric-valued and non-parametric tokens of the event message of interest;
identifying parametric-valued tokens of the event message of interest;
discarding the parametric-valued tokens of the event message of interest;
identifying punctuation and separation symbols of the event message of interest and of the non-parametric tokens of event message of interest; and
discarding the punctuation and separation symbols leaving the non-parametric tokens of the event message of interest without punctuation and separation symbols.

17. The medium of claim 15, wherein determining the one or more log write instructions and associated line numbers in the source code as candidates for generating the event message of interest comprises:
searching a source code data base stored in a data-storage device for one or more source codes having a name that is the same as the name of the source code;
searching the source code data base for a source code of the one or more source codes having a version that is the same as the version of the source code; and
identifying candidate log write instructions and corresponding lines in the source code.

18. The medium of claim 15, wherein identifying the non-parametric tokens of each of the one or more candidate log write instructions comprises:
for each of the one or more candidate log write instruction,
identifying non-printed characters that separate parametric-valued and non-parametric tokens of the event message of the candidate log write instruction;
identifying parametric-valued tokens of the event message of the candidate log write instruction;
discarding the parametric-valued tokens of the event message of the candidate log write instruction;
identifying punctuation and separation symbols of the event message of interest and of the non-parametric tokens of event message of the candidate log write instruction; and
discarding the punctuation and separation symbols leaving the non-parametric tokens of the event message of the candidate log write instruction without punctuation and separation symbols.

19. The medium of claim 15, wherein calculating the confidence score for each of the one or more candidate log write instructions comprises:
for each candidate log write instruction,
determining which non-parametric tokens of an event message of the candidate log write instruction and non-parametric tokens of the event message of interest are common to the candidate log write instruction and the event message of interest;
calculating a confidence score for each of the candidate log write instruction as a sum of a number of text matched non-parametric tokens of the event message of the candidate log write instruction and the event message of interest divided by a total number of non-parametric tokens of the event message of interest; and recording the confidence scores and lines numbers of the log write instructions in a data-storage device.

20. The medium of claim 19, wherein calculating the confidence score comprising calculating a weighted confidence score based on different types of the non-parametric tokens of the event message of interest.

21. The medium of claim 15, wherein displaying rank ordered candidate log write instructions and associated lines numbers of the source code in the graphical user interface further comprises providing one or more links, each link associated with one of the candidate log write statements that when clicked on displays lines of the source code surrounding the candidate log write instruction associated with the link.

* * * * *